US010088623B2

(12) United States Patent
Nakamura et al.

(10) Patent No.: US 10,088,623 B2
(45) Date of Patent: Oct. 2, 2018

(54) LIGHT EMITTING DEVICE

(71) Applicant: Saturn Licensing LLC, New York, NY (US)

(72) Inventors: Soichiro Nakamura, Kanagawa (JP); Hiroyasu Sato, Tokyo (JP); Masao Kondo, Kanagawa (JP); Hirotaka Tako, Kanagawa (JP); Keiichi Takahashi, Kanagawa (JP); Shin Yamamoto, Tokyo (JP); Ken Yano, Tokyo (JP); Takanobu Wada, Saitama (JP); Kazuya Tateishi, Tokyo (JP)

(73) Assignee: Saturn Licensing LLC, New York, NY (US)

( * ) Notice: Subject to any disclaimer, the term of this patent is extended or adjusted under 35 U.S.C. 154(b) by 0 days.

(21) Appl. No.: 15/935,267

(22) Filed: Mar. 26, 2018

(65) Prior Publication Data
US 2018/0210133 A1     Jul. 26, 2018

Related U.S. Application Data

(63) Continuation of application No. 14/366,898, filed as application No. PCT/JP2012/083142 on Dec. 20, 2012, now Pat. No. 9,964,684.

(30) Foreign Application Priority Data

Dec. 27, 2011   (JP) ................. 2011-286216

(51) Int. Cl.
*F21V 7/04*     (2006.01)
*F21V 8/00*     (2006.01)
(Continued)

(52) U.S. Cl.
CPC ......... *G02B 6/0045* (2013.01); *G02B 6/0038* (2013.01); *G02B 6/0051* (2013.01);
(Continued)

(58) Field of Classification Search
None
See application file for complete search history.

(56) References Cited

U.S. PATENT DOCUMENTS

| 6,574,414 B2 | 6/2003 | Schechtel et al. |
| 8,049,641 B2 | 11/2011 | Sugamura |

(Continued)

FOREIGN PATENT DOCUMENTS

| CN | 101649967 A | 2/2010 |
| EP | 2019251 A2 | 1/2009 |

(Continued)

OTHER PUBLICATIONS

International Search Report from International Publication PCT/JP2012/083142 dated Apr. 2, 2013.

(Continued)

*Primary Examiner* — Andrew Coughlin
(74) *Attorney, Agent, or Firm* — Lerner, David, Littenberg, Krumholz & Mentlik, LLP

(57) ABSTRACT

The present disclosure relates to a light emitting device that can improve design of emitted light.
A communication substrate is provided with an LED indicator which emits light. A light guiding plate has a concave surface portion which is a concave surface to cover the LED indicator, and receives the light from the LED indicator using the concave surface portion. A storage case stores the communication substrate and the light guiding plate in a state where a part of the light guiding plate is exposed. The light guiding plate allows the light from the LED indicator to penetrate to a part of the light guiding plate exposed from the storage case by diffusing the light received using the concave surface portion. For example, the present disclosure is applicable to the light emitting device that emits light using an LED or the like.

20 Claims, 29 Drawing Sheets

(51) Int. Cl.
*H04N 5/66* (2006.01)
*H04N 5/64* (2006.01)

(52) U.S. Cl.
CPC ............ *G02B 6/0073* (2013.01); *H04N 5/66* (2013.01); *G02B 6/0083* (2013.01); *H04N 5/64* (2013.01)

(56) References Cited

U.S. PATENT DOCUMENTS

| | | |
|---|---|---|
| 2004/0076020 A1 | 4/2004 | Hsieh |
| 2006/0164839 A1 | 7/2006 | Stefanov |
| 2009/0027224 A1 | 1/2009 | Sugamura |
| 2010/0053063 A1 | 3/2010 | Ishii |

FOREIGN PATENT DOCUMENTS

| | | |
|---|---|---|
| JP | H0341954 U | 4/1991 |
| JP | H0946700 A | 2/1997 |
| JP | H09127886 A | 5/1997 |
| JP | 2005265929 A | 9/2005 |
| JP | 2008022500 A | 1/2008 |
| JP | 2009031379 A | 2/2009 |
| JP | 2009186712 A | 8/2009 |
| JP | 2010055073 A | 3/2010 |

OTHER PUBLICATIONS

Microfilm of the specification and drawings annexed to the request of Japanese Utility Model Application No. 102895/1989(Laid-open No. 41954/1991)(Toshiba Corp.),Apr. 22, 1991 (Apr. 22, 1991),entire text; all drawings (Family: none).
Extended European Search Report for EP Application No. 12863445.8, dated Sep. 10, 2015.
Chinese Office Action for CN Application No. 201280063463.1, dated Dec. 1, 2015.
Japanese Office Action for Application No. 2013-551665 dated Feb. 7, 2017.

LIGHT EMITTING DEVICE

CROSS-REFERENCE TO RELATED APPLICATION

The present application is a continuation of U.S. patent application Ser. No. 14/366,898, filed on Jun. 19, 2014, which is a national phase entry under 35 U.S.C. § 371 of International Application No. PCT/JP2012/083142 filed Dec. 20, 2012, published on Jul. 4, 2013 as WO 2013/099773 A1, which claims priority from Japanese Patent Application No. JP 2011-286216, filed in the Japanese Patent Office on Dec. 27, 2011.

TECHNICAL FIELD

The present disclosure relates to a light emitting device, particularly, for example, to a light emitting device that improves design of light emitted therefrom.

BACKGROUND ART

For example, there is a light emitting method in which a light emitting diode (LED) is provided on a surface of a housing of a television receiver, and the LED emits light as illumination before a picture is displayed on the television receiver.

CITATION LIST

Patent Literature

PTL 1: Japanese Unexamined Patent Application Publication No. 2010-55073

SUMMARY OF INVENTION

Technical Problem

However, the light emitting method has a problem in that the light emitted from the LED is two-dimensionally seen, and the design for the light is not high quality.

The present disclosure is made in light of the problem, and for example, is intended to improve design of light emitted from a light emitting device.

Technical Problem

A light emitting device according to an aspect of the present disclosure includes a plate-shaped member that is provided with a light emitting unit which emits light; a concave member that has a concave surface portion which is a concave surface to cover the light emitting unit, and that receives the light from the light emitting unit using the concave surface portion; and a storage unit that stores the plate-shaped member and the concave member in a state where a part of the concave member is exposed. The concave member allows the light from the light emitting unit to penetrate to a part of the concave member exposed from the storage unit by diffusing the light received using the concave surface portion.

A bottom surface of the concave surface portion is a plate-shaped member formed in a semicircular shape. The plate-shaped member and the concave member may be stored in the storage unit in a state of exposing a first portion that is formed as a part of the concave member in a portion which corresponds to a chord of a semicircle on the bottom surface, and exposing a second portion that is formed as a part of the concave member in a portion which corresponds to an arc of the semicircle on the bottom surface.

The concave member may allow predetermined single colored light from the light emitting unit to penetrate to the first portion by diffusing the single colored light. The concave member may allow a plurality of colors of light from the light emitting unit to penetrate to the first and the second portions by diffusing the plurality of colors of light.

The light emitting unit may have a first irradiation unit that irradiates the predetermined single colored light in a direction in which the first portion is present, and a second irradiation unit that irradiates the plurality of colors of light in a direction in which the bottom surface of the concave surface portion is present.

The first irradiation unit is provided closer to the first portion than the second irradiation unit.

The light emitting device may be further provided with an adding unit that adds the storage unit to electronic equipment. The light emitting unit may emit light based on a control signal from the electronic equipment to which the storage unit is added via the adding unit.

The bottom surface and an upper surface facing the bottom surface of the concave member may have a wave shape.

The wave shape of the bottom surface may be coarser than that of the upper surface.

The light emitting device may be further provided with a supporting unit that supports the electronic equipment to which the storage unit is added, and that has a reflective surface which reflects light penetrating a part of the concave member exposed from the storage unit.

Advantageous Effects of Invention

According to the present disclosure, it is possible to improve design of light emitted from the light emitting device.

BEST MODES FOR CARRYING OUT THE INVENTION

Hereinafter, an embodiment of the present disclosure (hereinafter, referred to as an embodiment) will be described. Note that the description will be made in the following sequence.

1. Outline of the Present disclosure
2. Embodiment
3. Modification Example

1. Outline of the Present Disclosure

[Television Receiver 1 of the Related Art]

Figure 1:
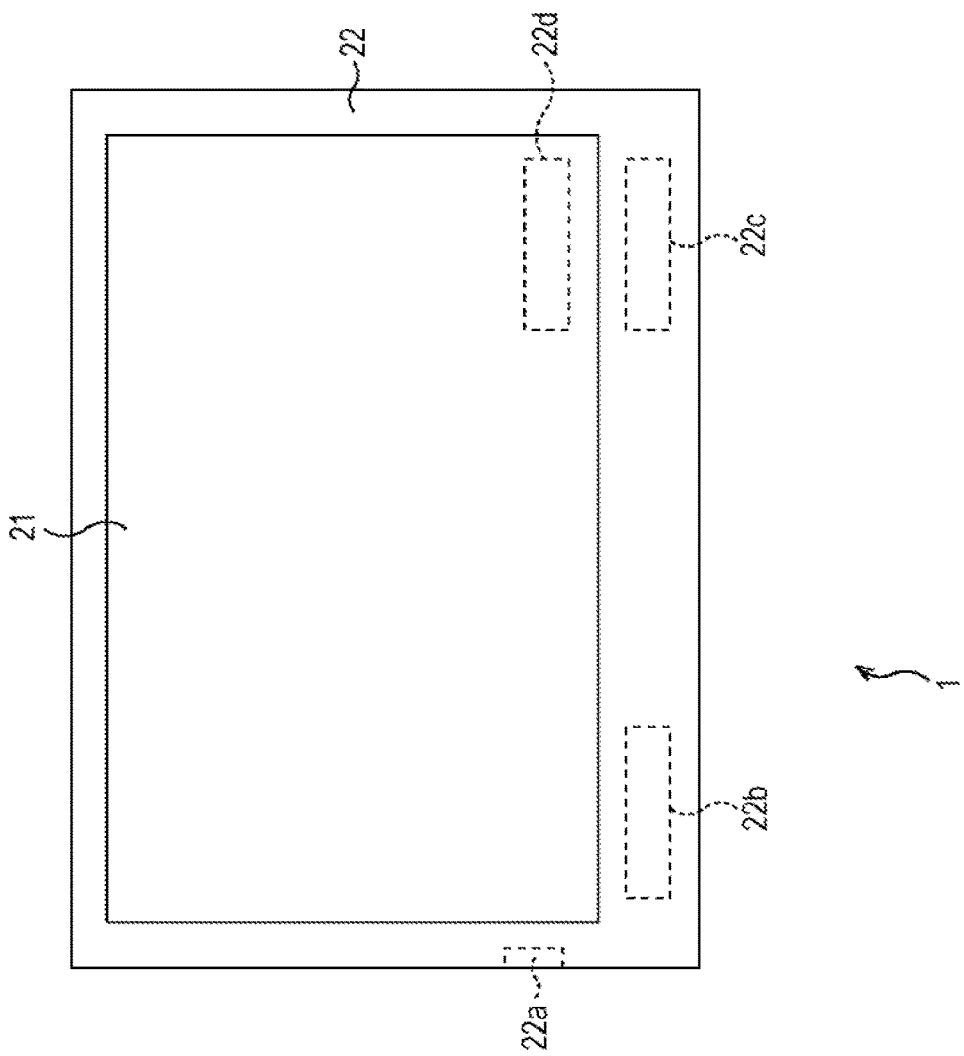
FIG. 1 is a front view of a television receiver of the related art.

FIG. 1 is a front view of a television receiver 1 of the related art.

The television receiver 1 of the related art is mainly configured to have a panel 21 on which an image is displayed, and a bezel portion 22 which is formed to surround four sides of the panel 21. For example, the television receiver 1 performs a process based on an operation signal from a remote controller which is operated by a user and is not illustrated.

In addition, for example, a USB terminal connection unit 22a connecting to a universal serial bus (USB) terminal is provided on a left side surface of a housing of the television receiver 1 in FIG. 1. Furthermore, the following is built in on a lower side (on a lower side in FIG. 1) of the bezel portion 22 of the television receiver 1: a light receiving circuit 22b that receives an infrared ray as an operation signal from the remote controller which is not illustrated; a detection circuit 22c that detects brightness of the surroundings; a speaker and the like. In addition, a communication circuit 22d to perform wireless communication using wireless fidelity (Wi-Fi) and the like are built in on a back surface of the panel 21.

For example, the present disclosure is intended to separate the USB terminal connection unit 22a, the light receiving circuit 22b, the detection circuit 22c, the communication circuit 22d and the like from the television receiver 1 of the related art, and to modularize the unit and the circuits described above. It is possible to add (connect) a smart unit obtained by the modularization to predetermined electronic equipment and to assign a new function to the predetermined electronic equipment.

Furthermore, for example, the smart unit obtained by the modularization irradiates soft light as if the soft light surrounds the smart unit, thereby improving design (for example, aesthetically pleasing appearance or the like).

2. Embodiment

[Example of Exterior of Television Receiver 41]

Figure 2:
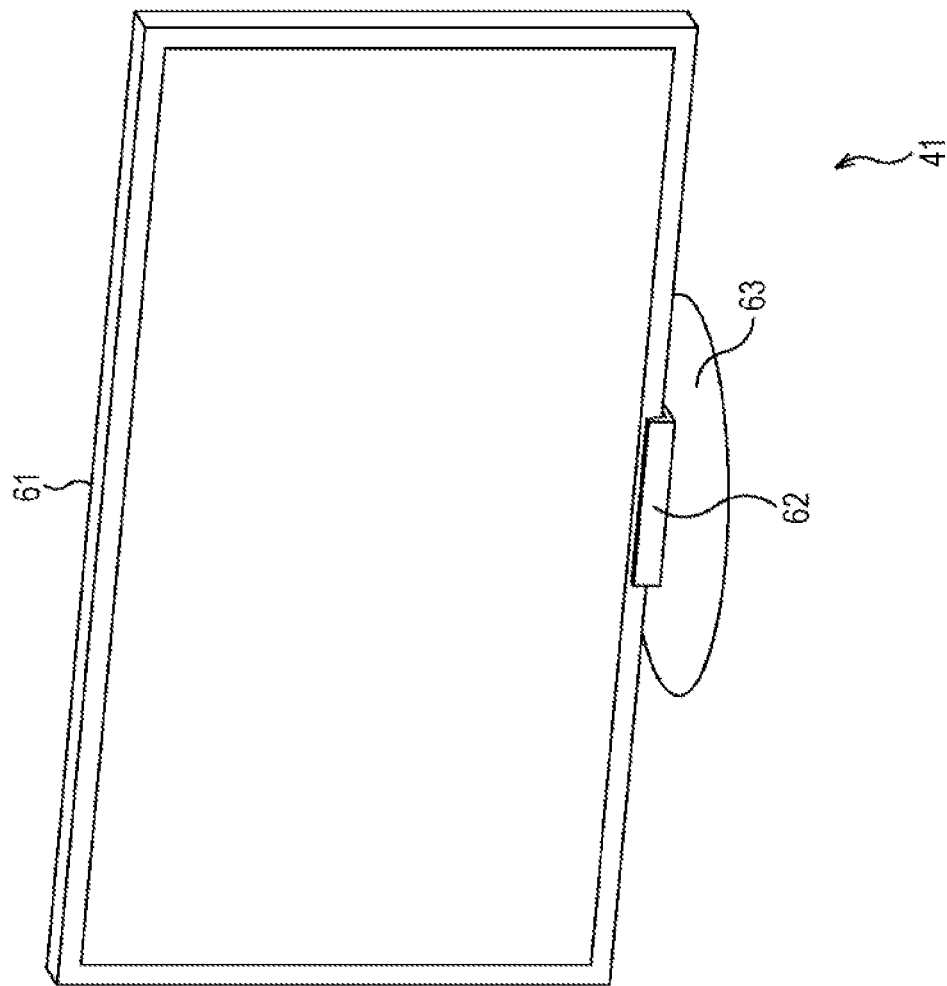
FIG. 2 is a view illustrating an example of an exterior of a television receiver according to the present disclosure.

Subsequently, FIG. 2 illustrates an example of an exterior of a television receiver 41 in the present disclosure.

The television receiver 41 is configured to have a display main body 61, a smart unit 62 that is added (connected) to a lower portion of the display main body 61, and a stand 63 that supports the display main body 61.

The display main body 61 is also configured to be attachable to and detachable from the stand 63. In the configuration in which the display main body 61 is attachable to and detachable from the stand 63, when the display main body 61 is detached from the stand 63, the display main body 61 with the smart unit 62 added can be used as the wall-mounted television receiver 41.

The display main body 61 has a built-in antenna and the like, and displays content such as a program received via the antenna. For example, the light receiving circuit 22b, the detection circuit 22c, the communication circuit 22d and the like which are illustrated in FIG. 1 are not built in the display main body 61, and only the minimum circuits for receiving and displaying a program and the like are mounted on the display main body 61.

For example, the USB terminal connection unit 22a, the light receiving circuit 22b, the detection circuit 22c, the communication circuit 22d and the like which are illustrated in FIG. 1 are built in the smart unit 62, and the smart unit 62 is added to the display main body 61.

The smart unit 62 added to the display main body 61 functions as a part of the display main body 61. That is, when the smart unit 62 is added to the display main body 61, a function of the smart unit 62 is assigned to the display main body 61.

In addition, the smart unit 62 is attachable to and detachable from the display main body 61. Note that in the description herein, the smart unit 62 obtained by the modularization is exemplified and the configuration, in which the smart unit 62 is attachable to and detachable from the display main body 61, is exemplified, but note that application of the present technology described hereinafter is not limited to the smart unit. For example, an application range of the present technology is not limited to the case where the smart unit 62 is configured separately from electronic equipment (the display main body 61), and the present technology can also be applied to a case where the smart unit 62 is configured integrally with the electronic device.

Furthermore, for example, the smart unit 62 has a built-in light emitting diode (LED) indicator 182 (to be described later in FIG. 7 and the like) that emits light based on a state of the display main body 61, and the smart unit 62 controls the LED indicator 182 to emit light or turn light off based on a control from the display main body 61.

Note that in the description herein, the LED indicator 182 is controlled to emit light or turn light off based on a control from the display main body 61, but that it is also possible to adopt a configuration in which the smart unit 62 itself controls the LED indicator 182 to emit light or turn light off.

For example, when the smart unit 62 is configured to be attachable to and detachable from the display main body 61, the present disclosure can also have a configuration in which the smart unit 62 itself detects a state of the display main body 61, for example, a state of a power supply being ON, and controls the LED indicator 182 to emit light or turn light off corresponding to the state. In addition, a structure, in which the smart unit 62 itself controls the LED indicator 182 to emit light or turn light off and functions as one of the interior, may be designed.

In the television receiver 41, the light receiving circuit 22b, the detection circuit 22c, the communication circuit 22d and the like which are illustrated in FIG. 1 are not built in the display main body 61, but are separated from the display main body 61 as the smart unit 62.

For this reason, the television receiver 1 of the related art has a wide lower side of the bezel portion 22 due to the light receiving circuit 22b, the detection circuit 22c, the communication circuit 22d and the like which are built in. However, in the television receiver 41, the width of the bezel portion is prevented from becoming wide. That is, according to the present technology, it is possible to realize a narrow bezel.

In addition, for example, in the television receiver 41, the smart unit 62 can be provided with the communication circuit 22d.

In the television receiver 1 of the related art illustrated in FIG. 1, the communication circuit 22d is provided on the back surface of the panel 21. When the communication circuit 22d is disposed on the back surface of the panel 21, there is a possibility that a wirelessly transmitted wireless signal is shut off by the panel 21. However, according to the present technology, the smart unit 62 is provided with the communication circuit 22d. The smart unit 62 is disposed at a position different from a position of the panel, and is not affected by the panel. That is, it is possible to prevent the panel of the display main body 61 from shutting off the wirelessly transmitted wireless signal by providing the communication circuit 22d in the smart unit 62.

Furthermore, in the television receiver 1 of the related art, the light receiving circuit 22b, the detection circuit 22c, the communication circuit 22d and the like are provided at separate locations. However, in the television receiver 41, the light receiving circuit 22b, the detection circuit 22c, the communication circuit 22d and the like are consolidated into the smart unit 62.

For this reason, a user can easily notice a position at which an infrared rays (IRs) receiving unit 173 receiving an operation signal from a remote controller and the like (to be described later in FIG. 7) are provided as a disposition position of the smart unit 62.

Accordingly, for example, when a user operates a remote controller which is not illustrated, the user can operate the remote controller in a state where a ray emitting portion of the remote controller is placed toward the smart unit 62 in such a manner that an operation signal from the remote controller is emitted toward the smart unit 62.

Accordingly, for example, under better conditions, the smart unit 62 of the television receiver 41 can receive an operation signal and the like from a remote controller which is not illustrated.

In addition, since the television receiver 41 can be configured in such a manner that the smart unit 62 is attachable and detachable with respect to the display main body 61, the smart unit 62 can be replaced to a smart unit 62 with a different function if necessary.

For this reason, a user who purchases the television receiver 41 can upgrade the television receiver 41 by replacing the smart unit 62 with another smart unit with more functions.

In addition, during manufacturing of the television receiver 41, it is possible to manufacture the television receiver 41 with a different function by connecting the smart unit 62 with any function to the display main body 61.

For this reason, during the manufacturing of the television receiver 41, the display main body 61 and the smart unit 62 can be manufactured in separate manufacturing lines. For this reason, compared to the television receiver 1 of the related art manufactured in the same manufacturing line, it is possible to improve productivity of the television receiver 41.

In addition, for example, since an IC chip and the like for performing wireless communication is not necessary to build in the display main body 61, a manufacturing man-hour can be reduced compared to when the television receiver 1 of the related art is manufactured.

Furthermore, it is possible to keep manufacturing costs of the television receiver 41 relatively low due to the improvement in the productivity of the television receiver 41 or the reduction of the manufacturing man-hour of the display main body 61.

[Example of Exterior of Smart Unit 62]

Subsequently, an exterior of the smart unit 62 will be described with reference to FIGS. 3 to 6.

Figure 3:
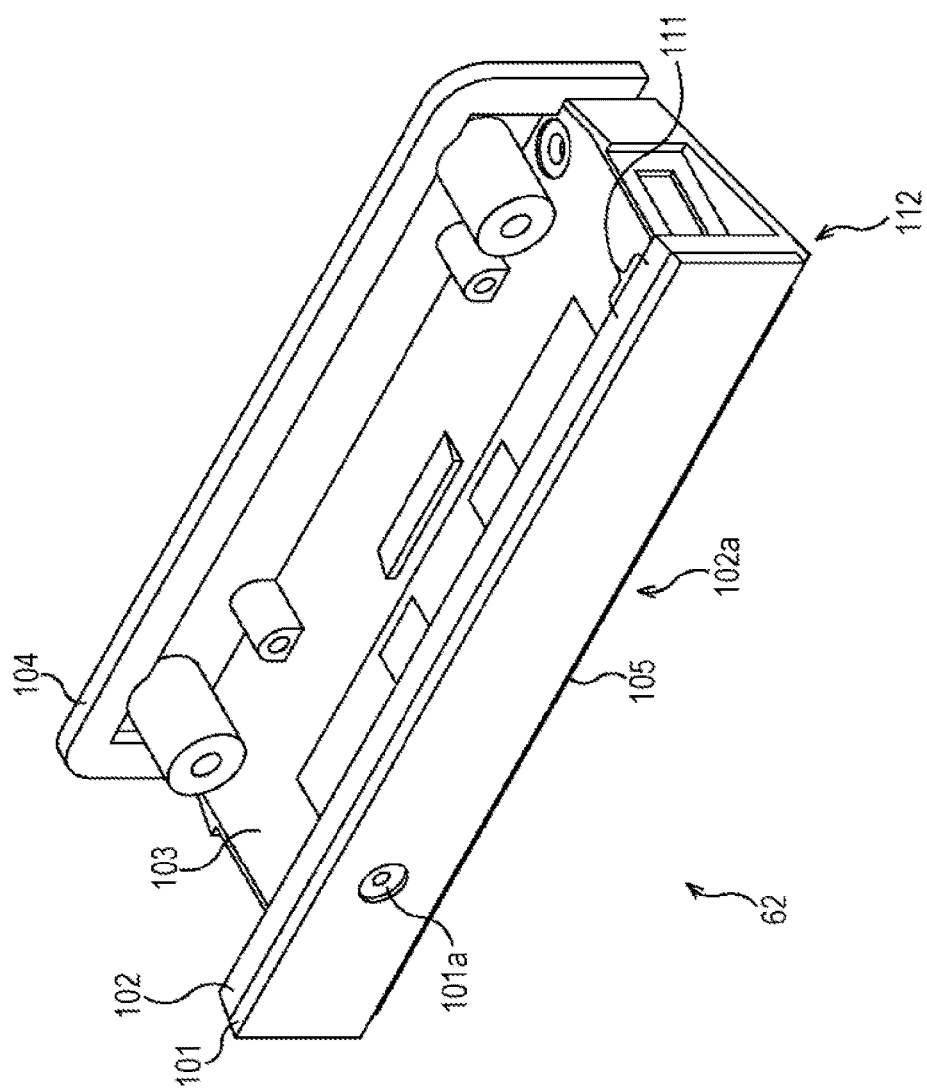
FIG. 3 is a perspective view of a smart unit seen from the top.
Figure 4:
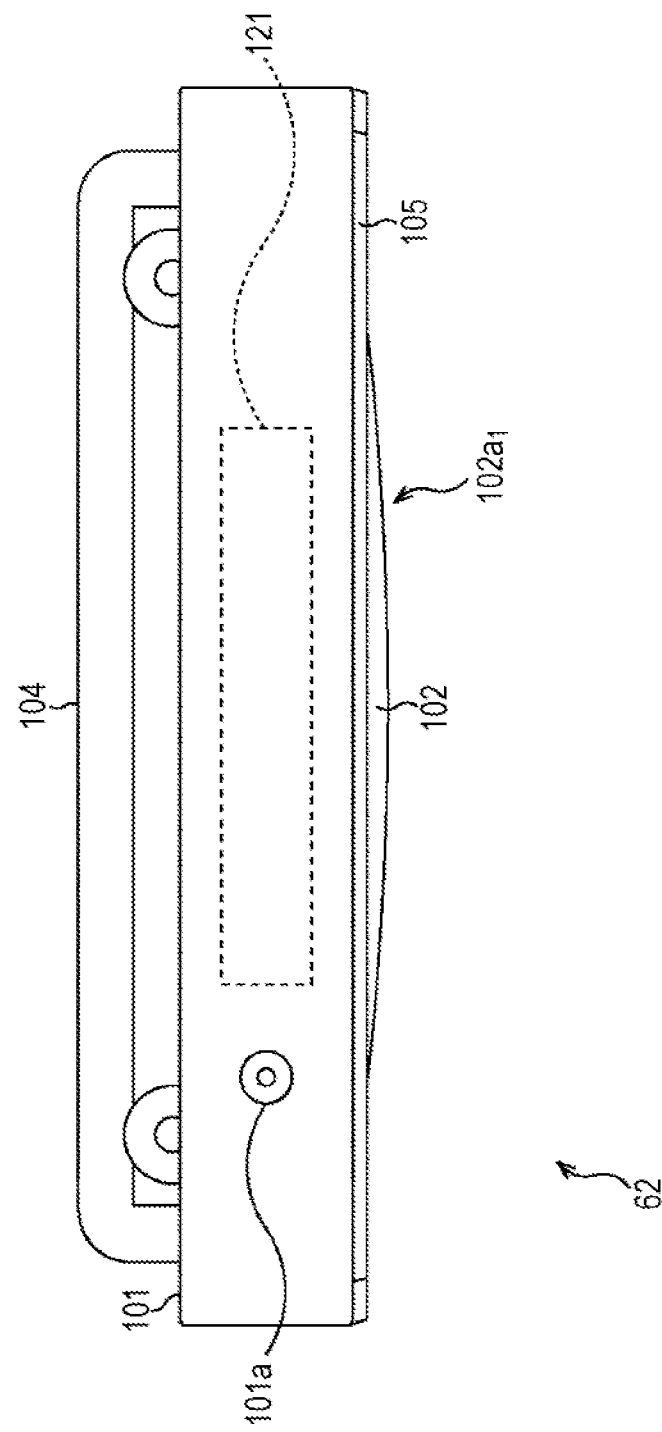
FIG. 4 is a front view of the smart unit.
Figure 5:
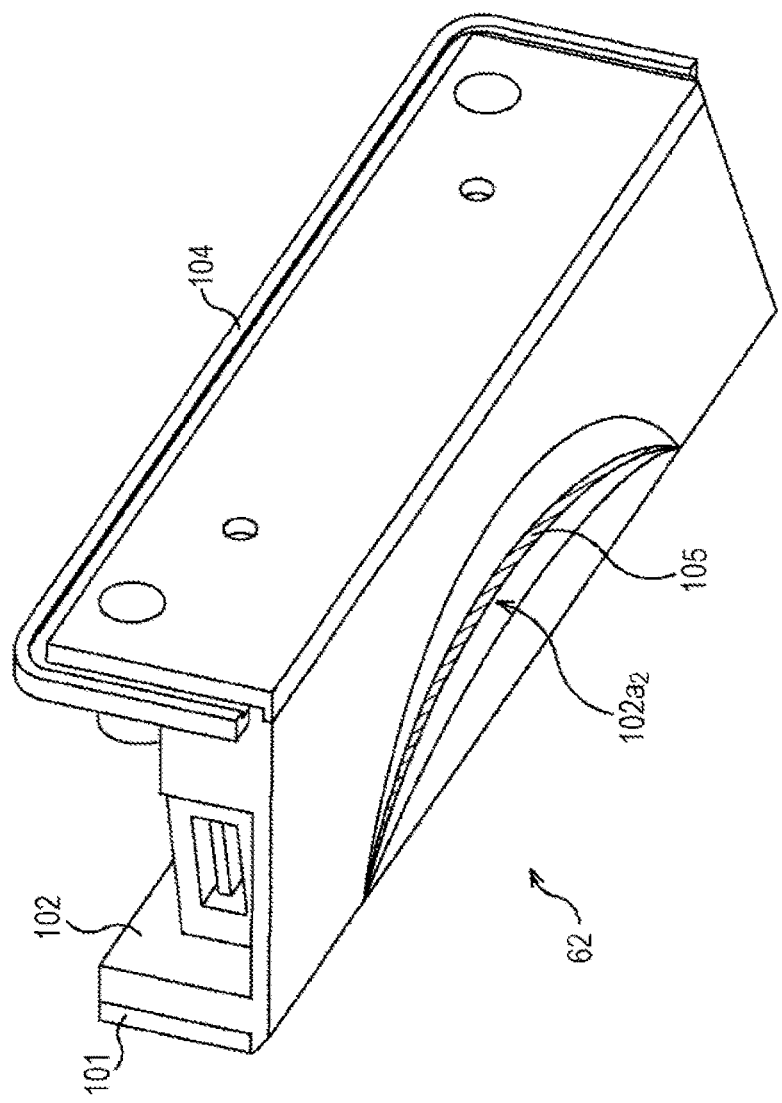
FIG. 5 is a perspective view of the smart unit seen from the bottom.
Figure 6:
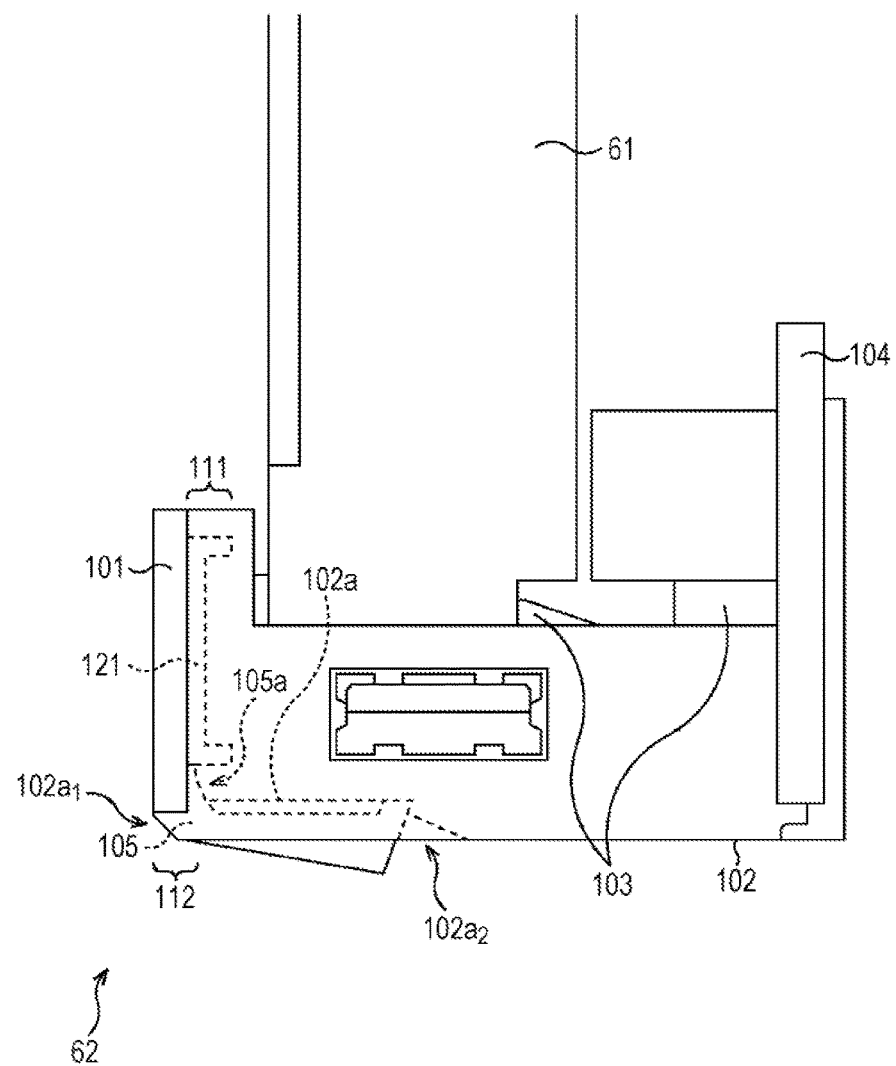
FIG. 6 is a side view of the smart unit seen from the right side.

FIG. 3 is a perspective view of the smart unit 62 as a unit body seen from the top in a state where the smart unit 62 is detached from the display main body 61 illustrated in FIG. 2. FIG. 4 is a front view of the smart unit 62. FIG. 5 is a perspective view of the smart unit 62 seen from the bottom. FIG. 6 is a side view of the smart unit seen from the right side.

As illustrated in FIG. 3, the smart unit 62 is configured to have a front panel 101, a storage case 102, a connection member 103, a rear cover 104 and a light guiding plate 105.

The front panel 101 has a plate shape and, a back surface of the front panel 101 adheres to a front surface of the storage case 102 in such a manner that the front panel 101 covers the front surface of the storage case 102. Herein, the front surface indicates a surface that is present in a direction (in a lower left direction in FIG. 3) which the front panel 101 is positioned. Unless there are any changes, the definition of the front surface is the same in other drawings.

In addition, for example, the following is built in between the front panel 101 and the storage case 102: a film antenna 121 (to be described later in FIG. 4 and the like) that is formed by adding an antenna for wireless communication to a film, or a camera substrate 201 (to be described later in FIG. 8 and the like) on which a camera is mainly provided.

Accordingly, for example, the front panel 101 is made of a material (for example, plastic, a resin film with high electromagnetic wave penetrability or the like) that allows a wireless signal and the like communicated by wireless communication to penetrate therethrough.

Note that the film antenna 121 also has a detection electrode that functions as a touch sensor which detects approach or contact of a user's hands or the like, and that the film antenna 121 detects a proximity operation or a contact operation with respect to a right end portion 111 of the storage case 102 and an proximity operation or a contact operation with respect to a lower end portion 112 (a portion that adheres to a base portion of the front panel 101) of the storage case 102.

Furthermore, for example, an exposure hole 101a or the like is provided on an external surface (a surface opposite to the surface which adheres to the storage case 102) of the front panel 101, and the exposure hole 101a is provided to allow a lens of a camera 175 (in FIG. 8 and the like) provided on the camera substrate 201 to be exposed therevia.

In addition, for example, it is possible to use the external surface of the front panel 101 as a decorative portion in which a logo, design or the like of a manufacturer of the smart unit 62 is depicted.

The display main body 61 and the smart unit 62 of the television receiver 41 can be separately manufactured. For example, during manufacturing of the television receiver 41, it is possible to ornament a comparatively small smart unit 62, and to mount the ornamented smart unit 62 on the display main body 61.

For this reason, for example, it is possible to more easily ornament the television receiver 41 compared to when the bezel of the comparatively large television receiver 1 of the related art is ornamented.

The storage case 102 has a substantially rectangular parallelopiped shape. The detailed description will be made with reference to FIG. 8, but the storage case 102 stores the film antenna 121; microphones 176 and 177; the camera substrate 201; a communication substrate 202 that is provided with USB terminal connection units 180 and 181, an IC for wireless communication and the like; the light guiding plate 105; and the like.

The front surface of the storage case 102 adheres to the back surface of the front panel 101 to overlap with each other. As described above, the film antenna 121 (in FIG. 4) and the camera substrate 201 (in FIG. 8) are built in between the storage case 102 and the front panel 101.

In addition, an upper surface of the storage case 102 is covered with the connection member 103, and a back surface of the storage case 102 is covered with the rear cover 104. Furthermore, a rectangular insertion opening is provided in each side surface of the storage case 102, and USB terminals from the outside can be connected to the USB terminal connection units 180 and 181 provided on the communication substrate 202.

Note that in the description herein, the smart unit 62 and the main body 61 are connected to each other via the USB terminal connection units 180 and 181, but the smart unit 62 and the main body 61 may be connected to each other via other interfaces in addition to a USB. For example, the smart unit 62 and the main body 61 may be connected to each other via an interface such as a universal asynchronous receiver transmitter (UART).

In addition, the storage case 102 is provided with a through hole 102a that passes through the storage case 102 from the front surface to a bottom surface thereof. The through hole 102a is provided below a portion on which the front surface of the storage case 102 overlap the back surface of the front panel 101, and the light guiding plate 105 is stored in the through hole 102a. Note that the light guiding plate is mentioned herein, but that the shape may be a cylindrical shape, and is not limited to the plate shape. In addition, the light guiding plate 105 may be also formed by combining a plurality of plate-shaped members.

Furthermore, an opening portion $102a_1$ (to be described later in FIG. 4 and the like) of the through hole 102a is formed in the front surface of the storage case 102, and an opening portion $102a_2$ (to be described later in FIG. 5 and the like) of the through hole 102a is formed in the bottom surface of the storage case 102.

The connection member 103 adheres to the storage case 102 to cover the upper surface of the storage case 102. In addition, the display main body 61 is formed to be attachable to and detachable from an external surface (a surface opposite to the surface which covers the upper surface of the storage case 102) of the connection member 103.

The rear cover 104 adheres to the storage case 102 to overlap the back surface of the storage case 102.

The light guiding plate 105 is stored in the storage case 102 in such a manner that the light guiding plate 105 is inserted into the through hole 102a provided in the storage case 102. In addition, the light guiding plate 105 has a concave surface portion 105a (to be described later in FIG. 8 and the like) that is a concave surface to guide light emitted from the LED, which is provided on the communication substrate 202 stored in the storage case 102, from the front surface-side opening portion $102a_1$ to the bottom surface-side opening portion $102a_2$.

FIG. 4 illustrates the front view of the smart unit 62, and a view when the front panel 101 is seen from the front surface. FIG. 5 illustrates the perspective view of the smart unit 62 seen from the bottom. According to FIG. 4, the opening portion $102a_1$ is provided on the front surface of the storage case 102, and is formed in a shape in which the opening portion $102a_1$ partially protrudes from a lower side of the front panel 101.

As illustrated in FIG. 4, the light guiding plate 105 is inserted into the opening portion $102a_1$ provided in the front surface of the storage case 102, and is stored in the through hole 102a. That is, the light guiding plate 105 is stored in the through hole 102a in such a manner that the light guiding plate 105 blocks the opening portion $102a_1$ provided in the front surface of the storage case 102, and the crescent-shaped opening portion $102a_2$ that is formed to depict an arc on the bottom surface of the storage case 102 as illustrated in FIG. 5.

In addition, as illustrated in FIG. 4, the film antenna 121 is stored on the back surface of the front panel 101 in a state where the film antenna 121 is pasted thereto. The film antenna 121 will be described in detail with reference to FIGS. 9 and 10.

Subsequently, FIG. 6 is the side view of the smart unit 62 illustrated in FIG. 4 seen from the right side in FIG. 4.

As illustrated in FIG. 6, the side surface of the storage case 102 has a substantially L shape. As illustrated in FIG. 6, the storage case 102 stores the light guiding plate 105 having the concave surface portion 105a, which is a concave surface, in the through hole 102a formed from the front surface of the storage case 102 to the bottom surface thereof.

In addition, the storage case 102 stores the film antenna 121 in front of (the left in FIG. 6) a display screen of the display main body 61.

That is, for example, the storage case 102 is formed to have a protruding portion that protrudes farther than a housing surface in a normal direction of the predetermined housing surface out of external surfaces of the housing of the display main body 61.

Specifically, for example, the storage case 102 is formed to have the protruding portion that protrudes to the left in FIG. 6 farther than a plane, in which the display screen of the display main body 61 is provided, in a normal direction of the plane in which the display screen of the display main body 61 is provided. The film antenna 121 is stored in the protruding portion of the storage case 102. Note that for example, as illustrated in FIG. 6, the protruding portion of the storage case 102 is formed to cover a part of the plane in which the display screen of the display main body 61 is provided.

For this reason, the smart unit 62 can perform wireless communication without a wireless signal being shut off by the display main body 61 (metal or the like of the display main body 61).

Note that the storage case 102 is manufactured in a state where it is predetermined that the protruding portion of the storage case 102 protrudes from any surface of the housing of the display main body 61.

In this case, in FIG. 6, it is presumed that a user is present in a direction of the plane in which the display screen of the display main body 61 is provided, that is, the user is present in the left direction in the drawing. Then, it is presumed that the user performs wireless communication with the smart unit 62 using a portable communication device.

Accordingly, the storage case 102 is formed in such a manner that the protruding portion of the storage case 102 protrudes from the plane in which the display screen of the display main body 61 is provided.

In addition, the camera substrate 201 is also stored in the protruding portion of the storage case 102. The camera substrate 201 is provided with the IR receiving unit 173 (to be described later in FIG. 7) that receives an infrared ray (receives light) as an operation signal emitted from a remote controller which is not illustrated.

Accordingly, even with regard to an operation signal in addition to a wireless signal, the smart unit 62 can similarly receive the operation signal without the operation signal as the wireless signal being shut off by the display main body 61.

[Functional Block Diagram of Television Receiver 41]

Figure 7:
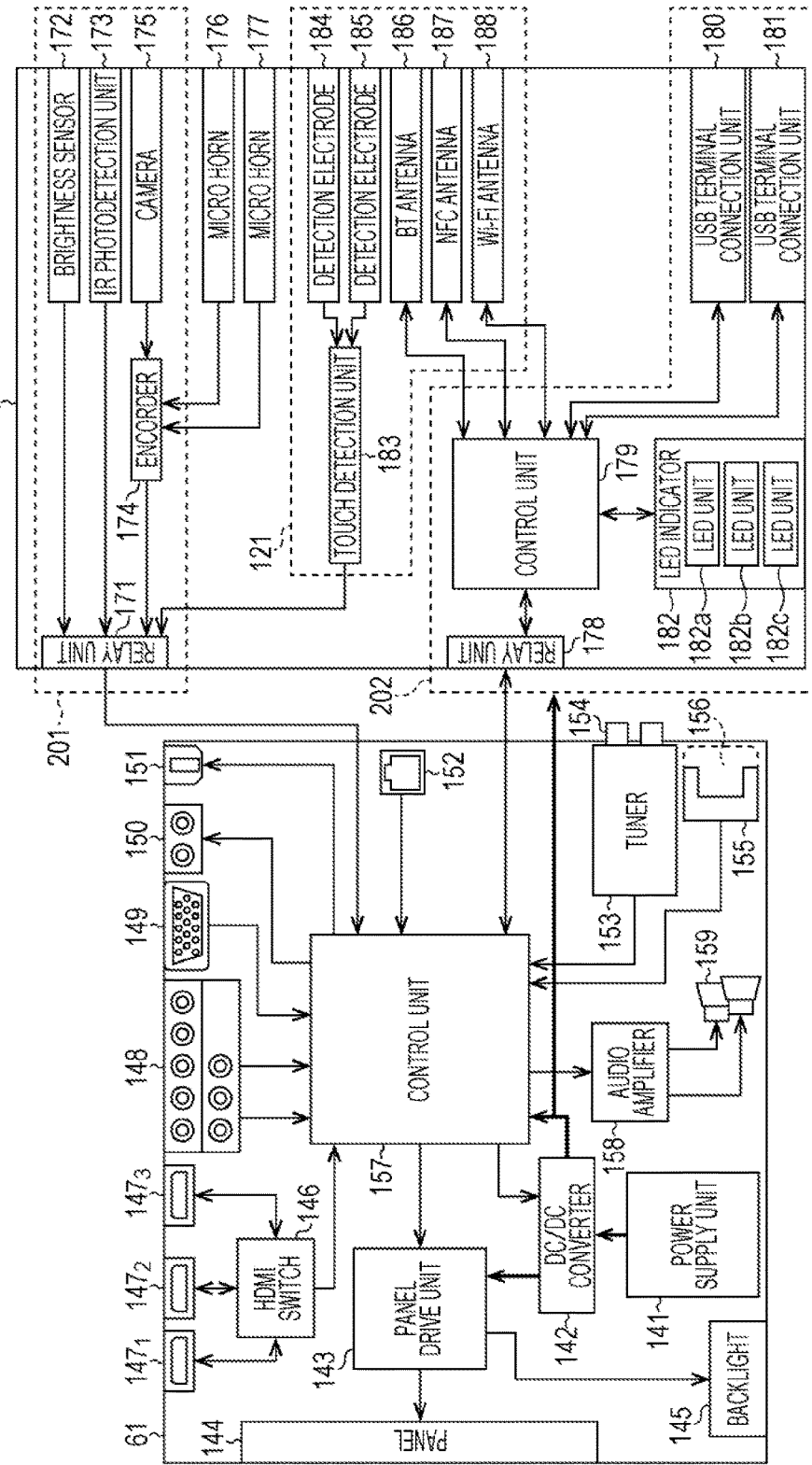
FIG. 7 is a block diagram illustrating an example of a functional configuration of the television receiver in FIG. 2.

Subsequently, FIG. 7 illustrates an example of a functional configuration of the television receiver 41.

The display main body 61 and the smart unit 62 are electrically connected to each other.

The display main body 61 is configured to have a power supply unit 141, a DC/DC converter 142, a panel drive unit 143, a panel 144, a backlight 145, a high-definition multi-media interface (HDMI) switch 146, HDMI terminals $147_1$ to $147_3$, an analog AV input terminal 148, a PC input terminal 149, an analog audio output terminal 150, an optical digital audio output terminal 151, a LAN terminal 152, a tuner 153, an antenna terminal 154, a CAS card I/F 155, a B-CAS (registered trademark) card 156, a control unit 157, an audio amplifier 158 and a speaker 159.

The power supply unit 141 is connected to an external AC power supply. The power supply unit 141 converts the received AC power supply to a predetermined voltage DC power supply to supply the converted DC power supply to the DC/DC converter 142. The DC/DC converter 142 converts a first power supply voltage supplied from the power supply unit 141 to a second power supply voltage and supplies the second power supply voltage to each unit such as the panel drive unit 143, the control unit 157, and the smart unit 62. Note that the power supply voltages supplied to each unit may be different from each other, or may be the same.

The panel drive unit 143 drives the panel 144 and the backlight 145 and displays an image based on an image signal supplied from the control unit 157. The backlight 145 is disposed on a back surface side of the panel 144, and a liquid crystal display (LCD) is configured to have the panel 144 and the backlight 145. The panel 144 controls aperture of a liquid crystal in each pixel based on a drive control from the panel drive unit 143. The backlight 145 emits light at predetermined luminance based on a drive control from the panel drive unit 143.

The HDMI switch 146 appropriately switches a HDMI terminal between the HDMI terminals $147_1$ to $147_3$ based on a control signal from the control unit 157, and relays HDMI signals which are sent and received between external equipment connected to the HDMI terminals $147_1$ to $147_3$ and the control unit 157. Each of the HDMI terminals $147_1$ to $147_3$ sends and receives a HDMI signal from external equipment which is a connection destination of each terminal.

An analog AV signal (an analog audio and visual signal) from external equipment is input via the analog AV input terminal 148, and is supplied to the control unit 157.

For example, the PC input terminal 149 is formed by a mini D-Sub 15-pin terminal, and an analog image signal out of an AV signal output from a personal computer is input via the PC input terminal 149, and is supplied to the control unit 157.

The analog audio output terminal 150 outputs an analog audio signal supplied from the control unit 157 to external equipment which is a connection destination. The optical digital audio output terminal 151 outputs an optical digital audio signal supplied from the control unit 157 to external equipment which is a connection destination.

For example, the LAN terminal 152 is formed by 10BASE-T/100BASE-TX connector or the like, and is connected to a predetermined network such as a home network or an internet.

The tuner 153 is connected to an antenna (not illustrated) via the antenna terminal 154, and acquires a broadcasting signal for a predetermined channel from a radio wave received by the antenna, and supplies the acquired broadcasting signal to the control unit 157. Note that in the embodiment, the radio wave received by the tuner 153 is, for example, the broadcasting signal of a terrestrial digital broadcasting.

The B-CAS (registered trademark) card 156 is inserted into the CAS card I/F 155, and stores an encryption key to decode scrambling of a terrestrial digital broadcasting. The CAS card I/F 155 reads the encryption key stored in the B-CAS (registered trademark) card 156, and supplies the read encryption key to the control unit 157.

The control unit 157 controls the entire television receiver 41. For example, the control unit 157 performs analog to digital (A/D) conversion processes or digital to analog (D/A) conversion processes of an image signal and an audio signal, a descrambling process or a decoding process of a broadcasting signal, and the like. In addition, the control unit 157 performs a control based on a brightness signal, an IR signal, a touch sensor signal, a universal serial bus (USB) I/F signal from the smart unit 62 to be described later, or also performs a LED control of the light emitting diode (LED) indicator 182. The control unit 157 can be formed by a single chip (a SoC: system on a chip).

The audio amplifier 158 amplifies an analog audio signal supplied from the control unit 157, and supplies the amplified analog audio signal to the speaker 159. The speaker 159 outputs a sound based on the analog audio signal from the audio amplifier 158.

Subsequently, a configuration of the smart unit 62 of the television receiver 41 will be described.

The camera substrate 201, the communication substrate 202 and the film antenna 121 are mainly stored in the storage case 102 of the smart unit 62.

The camera substrate 201 is provided with a relay unit 171, a brightness sensor 172, the IR receiving unit 173, an encoder 174 and the camera 175. In addition, the microphones 176 and 177 are stored in the storage case 102 to interpose the camera substrate 201 therebetween.

A brightness signal, an IR signal, a USB I/F signal and a touch sensor signal to be described later are sent and received between the control unit 157 of the display main body 61 and the smart unit 62 via the relay unit 171.

The brightness sensor 172 detects brightness (for example, brightness or the like of a room in which the television receiver 41 is installed) of the surroundings of the television receiver 41, and supplies the detected result as a brightness signal to the control unit 157 via the relay unit 171.

For example, when a user operates a remote controller which is not illustrated, the IR receiving unit 173 receives an IR signal that is emitted from the remote controller to correspond to the user's operation, and supplies the received IR signal to the control unit 157 via the relay unit 171.

The encoder 174 is connected to the camera 175 and the microphones 176 and 177. The camera 175 is configured to have an image capturing element such as a charge coupled device (CCD) image sensor or a complementary metal oxide semiconductor (CMOS) image sensor, and supplies an image signal obtained by capturing an image to the encoder 174. Each of the microphones 176 and 177 supplies an audio signal obtained by collecting sounds to the encoder 174. The encoder 174 performs signal processes such as A/D conversion processes of the image signal and the audio signal and an encoding process, and supplies the processed signals as USB I/F signals to the control unit 157 via the relay unit 171.

The communication substrate 202 is provided with a relay unit 178, a control unit 179, a USB terminal connection units 180 and 181 and the LED indicator 182.

An electric power supplied from the display main body 61 is supplied to each unit of the smart unit 62 via the relay unit 178. In addition, an LED control signal and a USB I/F signal to be described later are also sent and received between the control unit 157 of the display main body 61 and the smart unit 62 via the relay unit 178.

The relay unit 178 outputs a USB I/F signal, which is supplied from the control unit 179 according to a USB standard, to the control unit 157. In addition, the relay unit 178 supplies a USB I/F signal or an LED control signal from the control unit 157 to the control unit 179.

The control unit 179 is connected to the relay unit 178, the USB terminal connection units 180 and 181, the LED indicator 182, a Bluetooth (BT: registered trademark) antenna 186, a near field communication (NFC) antenna 187 and a Wi-Fi antenna 188.

The control unit 179 supplies data, which is supplied from the relay unit 178 as a USB I/F signal, to the BT antenna 186, and transmits the data to a communication device such as a portable telephone (that is, a smart phone) via wireless communication using the Bluetooth (registered trademark). In addition, the control unit 179 receives data, which is transmitted from the communication device via the wireless communication using the Bluetooth (registered trademark), via the BT antenna 186, and supplies the received data as a USB I/F signal to the control unit 157 via the relay unit 178.

The control unit 179 supplies the data, which is supplied from the relay unit 178 as a USB I/F signal, to the NFC antenna 187, and transmits the data to a communication device such as a portable telephone via contactless proximity wireless communication using the NFC. In addition, the control unit 179 receives data, which is transmitted from the communication device via the contactless proximity wireless communication using the NFC, via the NFC antenna 187, and supplies the received data as a USB I/F signal to the control unit 157 via the relay unit 178.

The control unit 179 supplies data, which is supplied from the relay unit 178 as a USB I/F signal, to the Wi-Fi antenna 188, and transmits the data to a communication device such as a portable telephone via wireless communication using the Wi-Fi. In addition, the control unit 179 receives data, which is transmitted from the communication device via the wireless communication using the Wi-Fi, via the Wi-Fi antenna 188, and supplies the received data as a USB I/F signal to the control unit 157 via the relay unit 178.

The USB terminal connection units 180 and 181 are connectors to which USB terminals are connected. For example, a USB memory, a hard disk storage device or the like as an external storage device is connected to the USB terminal connection unit 180 or 181. The USB terminal connection units 180 and 181 are provided on the side surface of the housing of the smart unit 62 to face each other.

For example, LED units 182a to 182c are built in the LED indicator 182, and the LED indicator 182 turn on or off the LED units 182a to 182c based on a LED control signal supplied from the control unit 157 via the relay unit 178 and the control unit 179.

Each of the LED units 182a to 182c is configured to have an LED that emits red color light, an LED that emits green color light, and an LED that emits blue color light. Note that in the embodiment, the LED unit 182a emits only single colored (for example, white color) light. For this reason, for example, the LED unit 182a may be configured to have LEDs that emit only white color light. In the embodiment, a configuration in which the LED unit 182a is configured to have LEDs that emit only white color light is described.

The film antenna 121 is provided with a touch detection unit 183, detection electrodes 184 and 185, the BT antenna 186, the NFC antenna 187, and the Wi-Fi antenna 188.

The touch detection unit 183 is connected to the detection electrodes 184 and 185. The touch detection unit 183 detects that a user is proximate to or contacts the left end portion 111 of the smart unit 62 based on a change in an electrostatic capacity of the detection electrode 184, and supplies the detected result as a touch sensor signal to the control unit 157 via the relay unit 171.

In addition, the touch detection unit 183 detects that a user is proximate to or contacts the lower end portion 112 of the smart unit 62 based on a change in an electrostatic capacity of the detection electrode 185, and supplies the detected result as a touch sensor signal to the control unit 157 via the relay unit 171.

The detection electrodes 184 and 185 are electrodes electrostatic capacities of which change when human's fingers or the like are proximate to the detection electrodes 184 and 185.

Note that the detection electrode 184 is built in the housing (on a back side of the right end portion 111 of the smart unit 62) of the smart unit 62. The detection electrode 184 is used to detect an operation of switching a state of a power supply to the television receiver 41 to either an ON state or an OFF state by a proximity operation or a contact operation of a user with respect to the right end portion 111.

In addition, the detection electrode 185 is built in the housing (on a back side of the lower end portion 112 of the smart unit 62) of the smart unit 62. For example, the detection electrode 185 is used to detect an operation of adjusting a sound volume of the television receiver 41 or the like by a proximity operation or a contact operation of a user with respect to the lower end portion 112.

The BT antenna 186 is an antenna used to perform wireless communication with a communication device such as a portable telephone using the Bluetooth (registered trademark). The NFC antenna 187 is an antenna used to perform contactless proximity wireless communication of the communication device using the NFC. The Wi-Fi antenna 188 is an antenna used to perform wireless communication with a communication device using the Wi-Fi.

[Example of Interior Configuration of Smart Unit 62]

Figure 8:
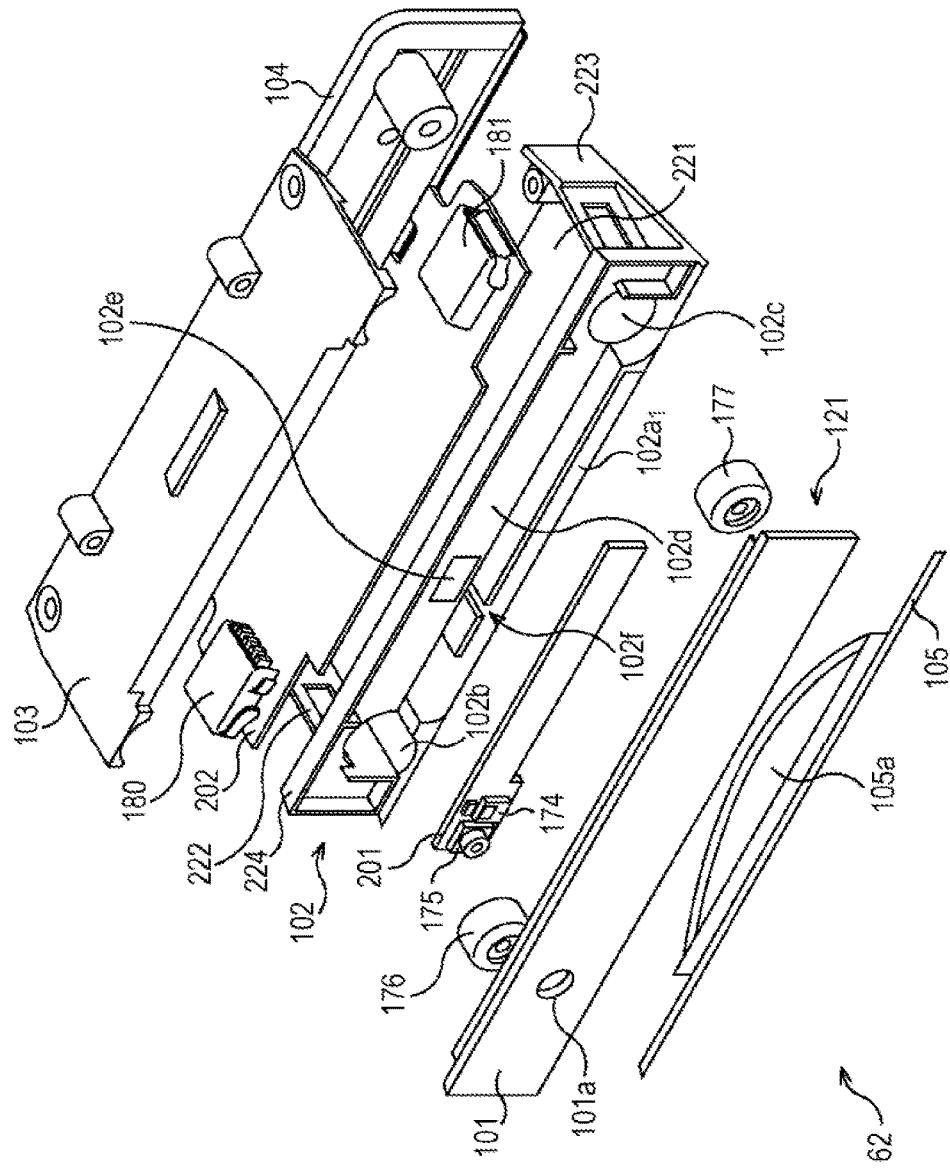
FIG. 8 is a view illustrating an example of an interior configuration of the smart unit.

Subsequently, a configuration of the storage case 102 of the smart unit 62 will be mainly described in detail with reference to FIG. 8. FIG. 8 illustrates an example of an interior configuration of the smart unit 62.

The storage case 102 is formed by a bottom surface portion 221, side surface portions 222 and 223 and a front surface portion 224.

The bottom surface portion 221 stores the communication substrate 202 that is provided with the USB terminal connection units 180 and 181 and the like. Note that only the USB terminal connection units 180 and 181 are illustrated on an external surface of the communication substrate 202 to avoid FIG. 8 from looking too complex, but, for example, an IC, which serves as the control unit 179, and the like are provided between the USB terminal connection units 180 and 181.

The side surface portions 222 and 223 are provided in a right and left direction of the bottom surface portion 221 in FIG. 8 to surround the bottom surface of the bottom surface portion 221.

The side surface portion 222 is provided with the rectangular insertion opening through which a USB memory or the like is connected to the USB terminal connection unit 180. The connection portion of the USB terminal connection unit 180 is visible from the outside of the housing of the smart unit 62 via the insertion opening of the side surface portion 222.

In addition, the side surface portion 223 is provided with the rectangular insertion opening through which a USB memory or the like is connected to the USB terminal connection unit 181. The connection portion of the USB terminal connection unit 181 is visible from the outside of the housing of the smart unit 62 via the insertion opening of the side surface portion 223.

Note that the side surface portions 222 and 223 support the connection member 103. In addition, the side surface portions 222 and 223 adhere to the rear cover 104. Accordingly, the communication substrate 202 is stored in a state where the communication substrate 202 is surrounded by the bottom surface portion 221, the side surface portions 222 and 223, the front surface portion 224, the connection member 103 and the rear cover 104.

The front surface portion 224 is provided in front of (in the direction in which the front panel 101 is present) the bottom surface portion 221 to surround the bottom surface of the bottom surface portion 221. Note that the front surface portion 224 has a height greater than those of the side surface portions 222 and 223. For this reason, for example, when the storage case 102 is seen from a side on which the side surface portion 223 is present, the storage case 102 has an L shape as illustrated in FIG. 6.

In addition, the front surface portion 224 is provided with the rectangular opening portion $102a_1$. The light guiding plate 105 is inserted into and stored in the opening portion $102a_1$.

Furthermore, cylindrical portions $102b$ and $102c$, each of which is formed in a cylindrical shape, are respectively provided on a left end side and a right end side of the front surface portion 224 in FIG. 8. The microphones 176 and 177 are respectively stored in the cylindrical portions $102b$ and $102c$.

In addition, the front surface portion 224 has a concave portion $102d$ provided between the cylindrical portions $102b$ and $102c$ and above the opening portion $102a_1$. The camera substrate 201 is disposed and stored in the concave portion $102d$.

Figure 9:
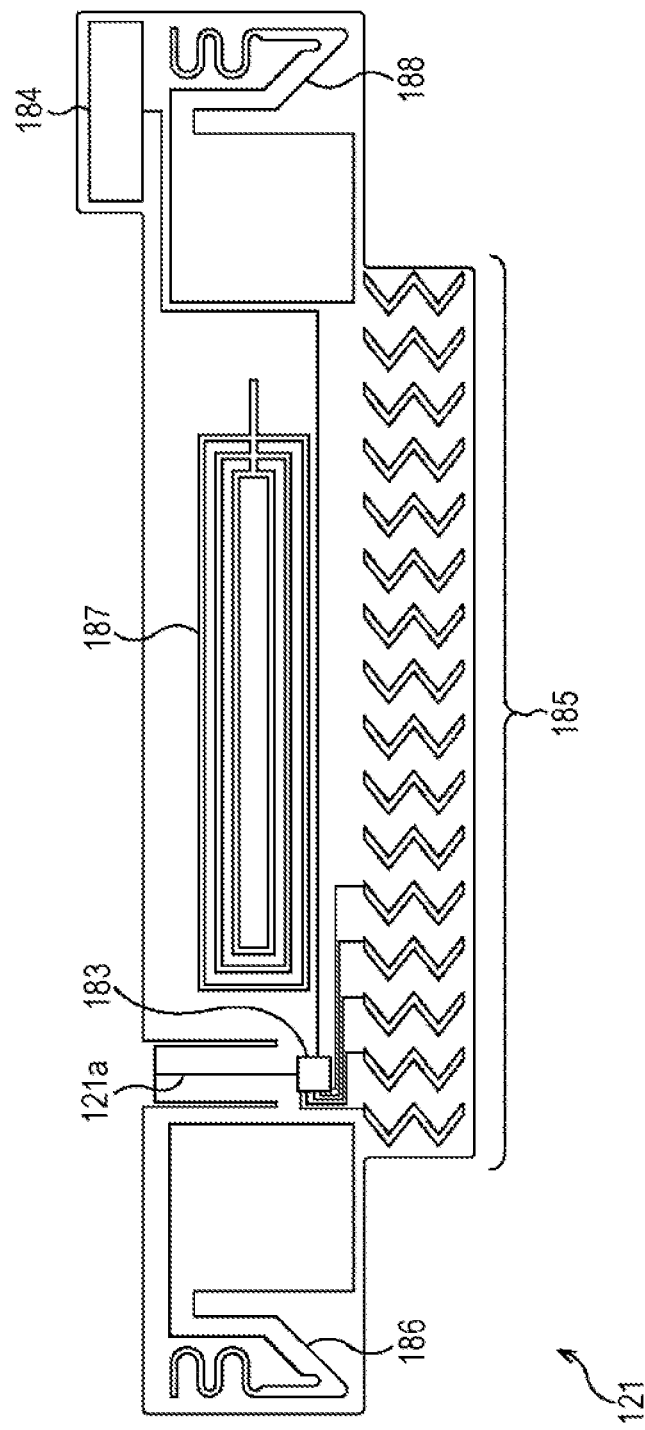
FIG. 9 is a view illustrating an example of a detailed configuration of a film antenna.

In addition, the concave portion $102d$ is provided with a hole $102e$ through which signal lines pass to electrically connect the BT antenna 186, the NFC antenna 187 and the Wi-Fi antenna 188 (all are illustrated in FIG. 9) provided in the film antenna 121 and the control unit 179 which is provided on the communication substrate 202 and is not illustrated. Furthermore, the concave portion $102d$ is provided with a groove $102f$ in which a signal line $121a$ (to be described later in FIG. 9) is disposed to electrically connect the camera substrate 201 and the touch detection unit 183 provided in the film antenna 121.

Note that the camera substrate 201 has the encoder 174 and the camera 175 provided on a surface thereof which faces the front panel 101. In addition, only the encoder 174 and the camera 175 are illustrated on the camera substrate 201 to avoid the drawing from looking too complex, and the brightness sensor 172, the IR receiving unit 173 and the like are not illustrated.

For example, the camera substrate 201 has the brightness sensor 172 and the IR receiving unit 173 provided on the surface thereof which faces the front panel 101 in a state where light receiving surfaces of the brightness sensor 172 and the IR receiving unit 173 are disposed toward the front panel 101. In addition, for example, the camera substrate 201 has the relay unit 171 provided on a back side of the surface which faces the front panel 101.

Furthermore, the light guiding plate 105 has the concave surface portion $105a$, and as illustrated in FIG. 8, a bottom surface of the concave surface portion $105a$ is made of a plate-shaped member that is formed in a semicircular shape.

As illustrated in FIG. 4, the light guiding plate 105 is stored in the storage case 102 in a state of exposing a linear portion, which is formed in a portion corresponding to a chord of a semicircle on the semicircular bottom surface of the concave surface portion 105a, from the opening portion $102a_1$ provided in a lower portion of the front panel 101.

In addition, as illustrated in FIG. 5, the light guiding plate 105 is stored in the storage case 102 in a state of exposing a portion, which is formed in a portion corresponding to an arc of the semicircle on the semicircular bottom surface of the concave surface portion 105a, from the opening portion $102a_2$ provided in the bottom surface (the bottom surface portion 221 in FIG. 8) of the storage case 102.

[Details of Film Antenna 121]

Subsequently, FIG. 9 illustrates an example of a detailed configuration of the film antenna 121 added to the back side of the front panel 101.

As illustrated in FIG. 9, for example, the film antenna 121 is obtained by disposing the touch detection unit 183 as an IC, the detection electrodes 184 and 185, the BT antenna 186, the NFC antenna 187, and the Wi-Fi antenna 188 on a film. For example, a film made of polyethylene terephthalate (PET), a polimide film or the like can be adopted as the film on which the touch detection unit 183 and the like are disposed.

In addition, the touch detection unit 183 is connected to the detection electrodes 184 and 185, and is also connected to the signal line 121a that outputs a detected result based on a change in electrostatic capacities of the detection electrodes 184 and 185. Note that a part of signal lines connecting the touch detection unit 183 and the detection electrode 185 is not illustrated in FIG. 9 to avoid the drawing looking too complex.

In addition, as illustrated in FIG. 9, in the film antenna 121, the BT antenna 186 and the Wi-Fi antenna 188 are disposed apart from each other as much as possible. Accordingly, it is possible to suppress occurrence of interference between wireless communication using the Bluetooth (registered trademark) and wireless communication using the Wi-Fi.

Note that as described later, it is also possible to adopt a configuration in which a member such as a gasket is provided between the BT antenna 186 and the Wi-Fi antenna 188 to shut off communication and thus, it is possible to suppress occurrence of interference between wireless communication using the Bluetooth (registered trademark) and wireless communication using the Wi-Fi.

Furthermore, one end of the signal line 121a on the film antenna 121 is connected to the touch detection unit 183, and the other end of the signal line 121a is connected to the IC (the relay unit 171) on the camera substrate 201. Note that the signal line 121a is disposed in the groove 102f in FIG. 8 so that the signal line 121a can be connected to the IC of the camera substrate 201. A relationship between the camera substrate 201 and the signal line 121a will be described in detail with reference to FIG. 10.

By the way, as illustrated in FIG. 9, the touch detection unit 183 is disposed in the film antenna 121, but for example, the touch detection unit 183 may be provided on the camera substrate 201.

However, in this case, it is necessary to provide the same number of the signal lines, which connect the detection electrodes 184 and 185 on the film antenna 121 and the touch detection unit 183 on the camera substrate 201, as the total number of the detection electrodes 184 and 185.

Accordingly, it is preferable that the touch detection unit 183 be disposed on the film antenna 121, and the film antenna 121 be connected to the camera substrate 201 via a single signal line, that is, the signal line 121a.

Figure 10:
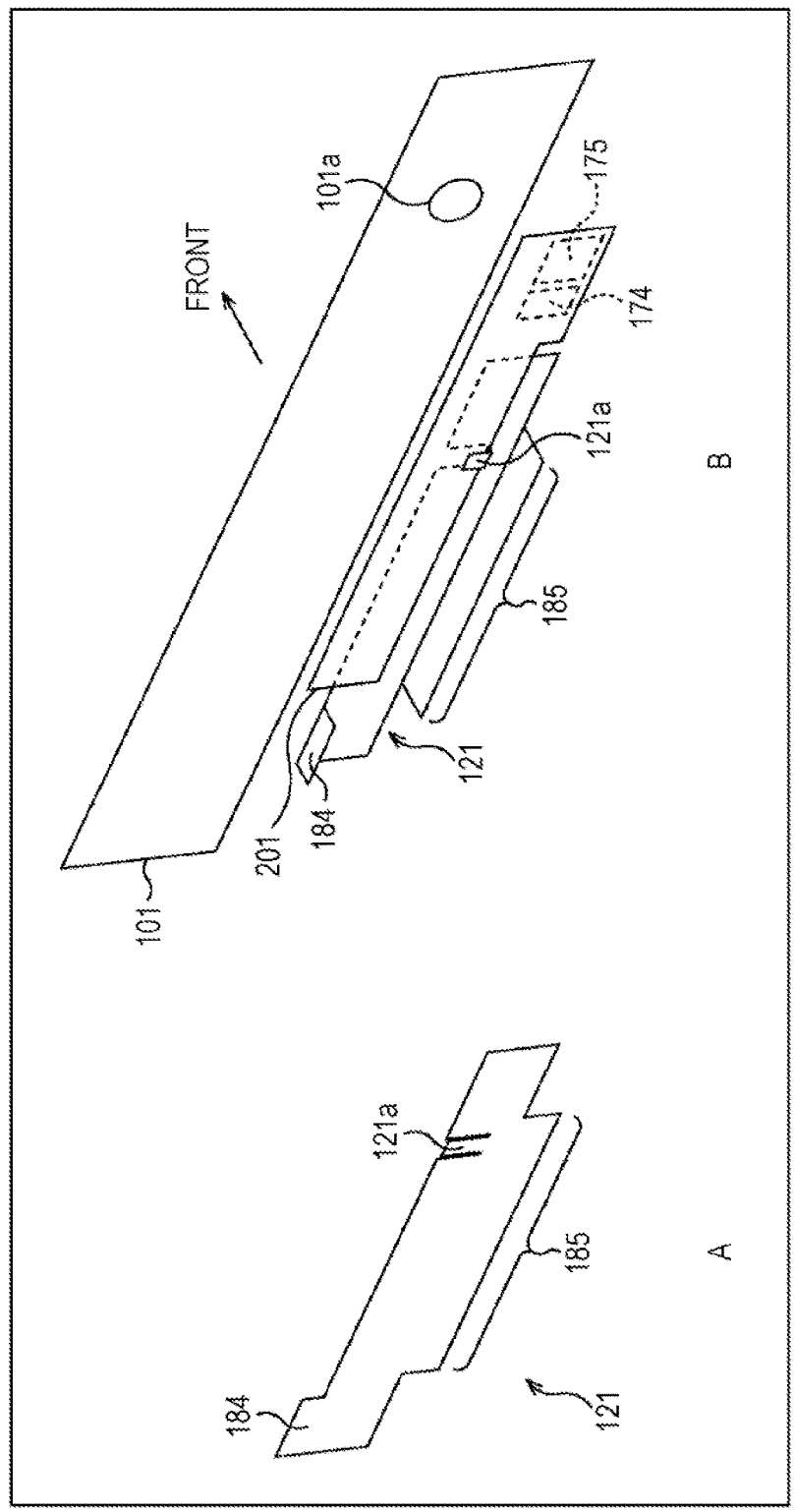
FIG. 10 is a view illustrating an example of an exterior of the film antenna.

Subsequently, FIG. 10 illustrates an example of an exterior of the film antenna 121 when the film antenna 121 is disposed between the front panel 101 and the camera substrate 201.

FIG. 10A illustrates an example of the film antenna 121 seen from an opposite side (a back side of a drawing sheet of FIG. 9) in FIG. 9.

FIG. 10B illustrates an example of the film antenna 121 when the film antenna 121 is disposed between the front panel 101 and the camera substrate 201.

The film antenna 121 is deformed from a state illustrated in FIG. 10A to a state illustrated in FIG. 10B. That is, as illustrated in FIG. 10B, the film antenna 121 is bent in such a manner that the detection electrode 184 is oriented upward in FIG. 10B, the detection electrode 185 is oriented downward in FIG. 10B, and the signal line 121a can be connected to the relay unit 171 provided on a back surface side of the camera substrate 201.

The film antenna 121 is disposed between the front panel 101 and the camera substrate 201 in a state where the film antenna 121 is deformed as illustrated in FIG. 10B.

Herein, the connection between the film antenna 121 and the control unit 179 will be additionally described. As described with reference to FIG. 8, the BT antenna 186, the NFC antenna 187 and the Wi-Fi antenna 188 (all are illustrated in FIG. 9) which are provided in the film antenna 121 are electrically connected to an IC which serves as the control unit 179 of the communication infrastructure 202 and the like via the signal line disposed via the hole 102e.

Figure 11:
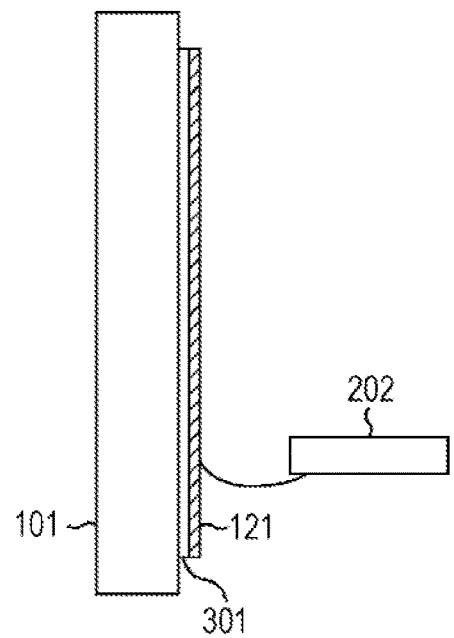
FIG. 11 is a view describing a connection between the film antenna and a communication infrastructure.

In this case, as illustrated in FIG. 11, when the front panel 101 and the like are seen from the side, for example, the front panel 101 and the film antenna 121 are pasted together using a double-sided tape 301. The signal line from the film antenna 121 is inserted into the hole 102e provided in the storage case 102, and is connected to the control unit 179 of the communication infrastructure 202 stored in the storage case 102.

In this way, it is possible to adopt the configuration in which the film antenna 121 is connected to the communication infrastructure 202 via the signal line. However, if the signal line passes through the hole 102e and after the signal line passes through the hole 102e, the signal line is connected to the communication infrastructure 202 using soldering, there is a possibility that it takes time and labor during manufacturing process.

Figure 12:
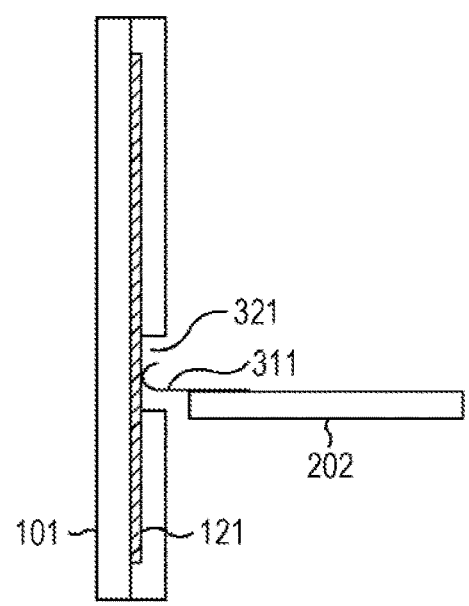
FIG. 12 is a view describing the connection between the film antenna and a communication infrastructure.

For example, the film antenna 121 may be connected to the camera substrate 202 using a spring or the like instead of the signal line. Referring to FIG. 12, a contact portion 311 is provided in the communication infrastructure 202. The contact portion 311 is fixed to the communication infrastructure 202 using soldering or the like, and is connected to the control unit 179 (not illustrated in FIG. 12).

In addition, the film antenna 121 and the front panel 101 are molded in a state where the film antenna 121 is encapsulated in the front panel 101. The front panel 101 has a cutout portion 321 provided on the communication infrastructure 202 side. In the cutout portion 321, the film antenna 121 is exposed from the front panel 101. The film antenna 121 exposed in the cutout portion 321 is configured to be in contact with a part of the contact portion 311.

The contact portion 311 may be made of a material that allows the film antenna 121 and the communication infrastructure 202 (the control unit 179) to be electrically connected to each other. In addition, the contact portion 311 may have a plate shape or the like, may have a bar shape or the like. Furthermore, the contact portion 311 may be configured in such a manner that the contact portion 311 is formed of a plate with a certain thickness, and a surface of the plate is in surface contact with the film antenna 121.

In addition, as illustrated in FIG. 12, the contact portion 311 is formed to have a U-shaped selection portion on a side opposite to the side on which the contact portion 311 is connected to the communication infrastructure 202. In addition, the selection portion may not have a U shape but may have an L shape or the like. The selection portion may have a shape that allows the contact portion 311 to be reliably in contact with the film antenna 121. In addition, if the contact portion 311 can come into contact with the film antenna 121 via a connector, a contact point of the contact portion or the like, the contact portion 311 may have any shape.

The film antenna 121 can be encapsulated in the front panel 101 using an insert molding method or a two-color molding method during manufacturing of the front panel 101. This configuration enables an optimization measure such as even further downsizing of configuration components. In addition, it is possible to reduce time and labor of manufacturing.

Figure 13:
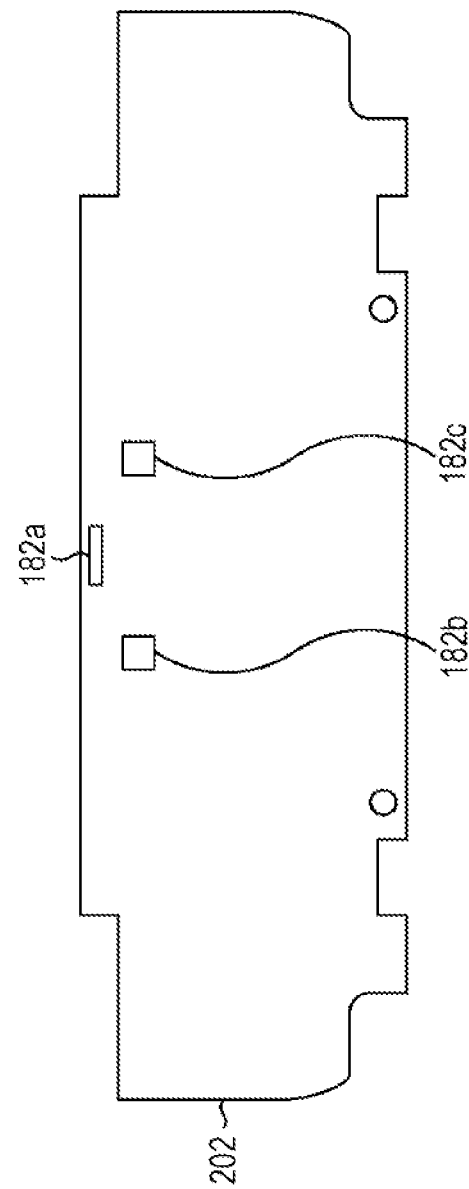
FIG. 13 is a view illustrating an example of a back surface of the communication substrate.

Subsequently, FIG. 13 illustrates an example of a back surface of the communication substrate 202.

The LED units 182a, 182b and 182c of the LED indicator 182 are provided on the back surface (a surface that faces the bottom surface portion 221 of the storage case 102) of the communication substrate 202 as follows: the LED unit 182a is provided on an upper middle side in FIG. 13, the LED unit 182b is provided on a lower left side of the LED unit 182a in FIG. 13, and the LED unit 182c is provided on a lower right side of the LED 182b in FIG. 13.

Figure 14:
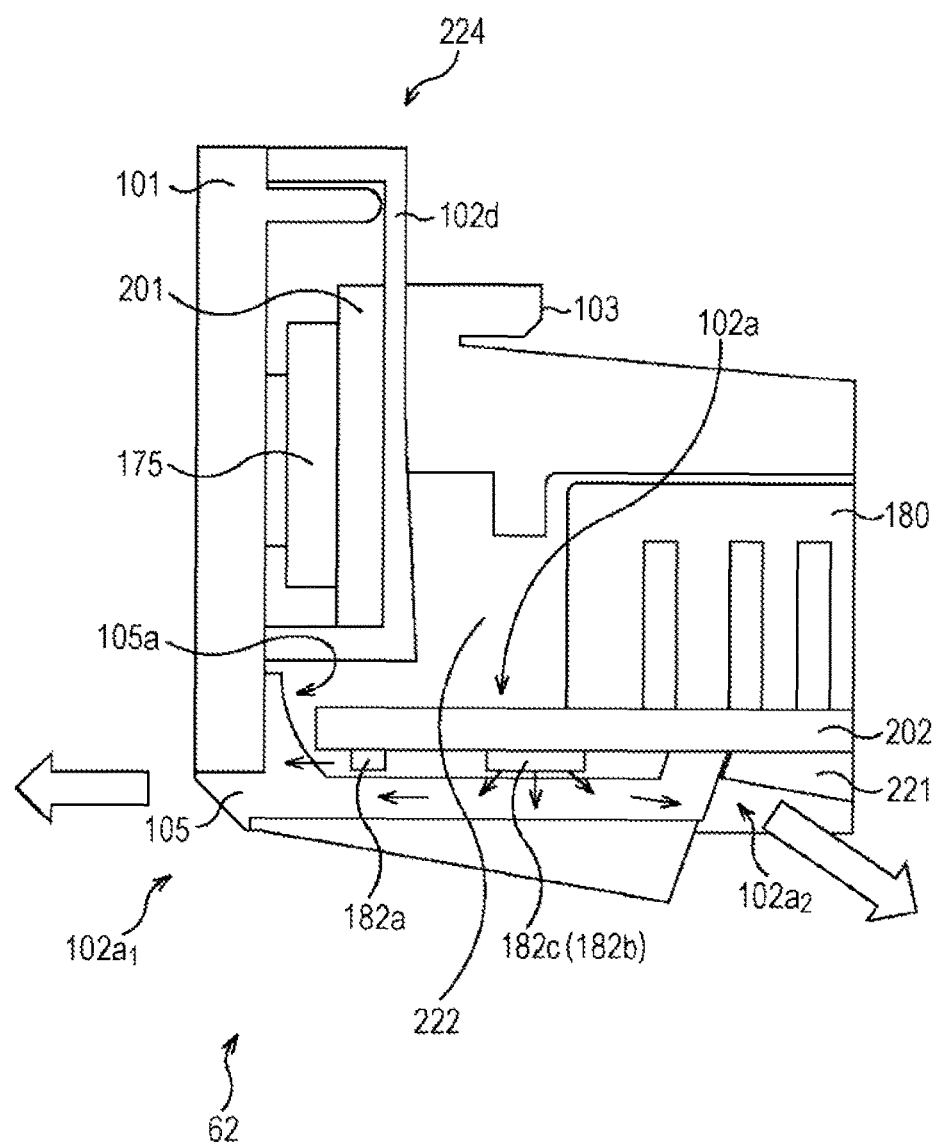
FIG. 14 is a side view illustrating an example of the interior configuration of the smart unit seen from the side.

FIG. 14 illustrates an example of the interior configuration of the smart unit 62 seen from the side.

Note that a forward direction of light is indicated by arrows illustrated in the vicinity of the LED units 182a to 182c and the light guiding plate 105 in FIG. 14. In addition, bold arrows indicate directions in which light leaks out from the opening portion $102a_1$ and $102a_2$ in FIG. 14.

As illustrated in FIG. 14, the communication substrate 202 is disposed in such a manner that the back surface of the communication substrate 202 faces the concave surface portion 105a of the light guiding plate 105 stored in the through hole 102a.

For example, the LED unit 182a irradiates white color light toward the left direction in FIG. 14. That is, for example, the LED unit 182a is formed by a right-angle type LED which is disposed on the back surface of the communication substrate 202 in such a manner that the surface (in a horizontal direction of FIG. 14) of the communication substrate 202 coincides with a light axis of the LED, and a light emitting surface of the LED faces the left direction in the drawing, and the LED unit 182 irradiates light toward the left direction in the drawing.

The LED unit 182b irradiates light downward in the drawing. That is, for example, the LED unit 182b is formed by a top entry type LED which is disposed on the back surface of the communication substrate 202 in such a manner that a normal direction (a vertical direction in FIG. 14) of the surface of the communication substrate 202 coincides with a light axis of the LED, and a light emitting surface of the LED faces the bottom in the drawing, and the LED unit 182b irradiates light having an angle wider than that of the LED unit 182a.

In addition, the LED unit 182b is a top entry type LED, and has an LED that emits red color light, an LED that emits green color light, and an LED that emits blue color light. For this reason, the LED unit 182b emits various colors of light based on luminance of each LED.

Furthermore, each LED of the LED unit 182b is adapted to have an angle wider than that of the LED of the LED unit 182a, and irradiates light wider than the LED of the LED unit 182a. Note that the LED unit 182c has the same configuration as that of the LED unit 182b.

The light guiding plate 105 is stored in the storage case 102 to block the opening portion $102a_1$ provided in the front surface portion 224 of the storage case 102 and the opening portion $102a_2$ provided in the bottom surface portion 221 of the storage case 102.

In addition, the light guiding plate 105 has the concave surface portion 105a formed to surround the LED units 182a, 182b and 182c which are provided on the back surface of the communication substrate 202.

Furthermore, for example, the light guiding plate 105 is made of a member such as transparent plastic that allows light to penetrate therethrough. The light guiding plate 105 guides light to the opening portion $102a_1$ by receiving light from the LED unit 182a and diffusing the light with the concave surface portion 105a. In addition, the light guiding plate 105 guides light to the opening portions $102a_1$ and $102a_2$ by receiving light from the LED units 182b and 182c and diffusing the light with the concave surface portion 105a.

As such, since light from the LED units 182a, 182b and 182c is diffused by the light guiding plate 105 as indicated by the arrows on the light guiding plate 105 illustrated in FIG. 14, the light becomes light (diffused light) that a human feels soft.

The light diffused by the light guiding plate 105 is irradiated from the opening portion $102a_1$ or $102a_2$ as indicated by the bold arrows illustrated in FIG. 14. Note that a state of light from the opening portions $102a_1$ and $102a_2$ will be described with reference to FIGS. 18 and 19.

The light guiding plate 105 is not preferably made of a colorless and transparent member but made of a transparent member to which a predetermined color is added.

When the colored light guiding plate 105 is used, the LED units 182a, 182b and 182c (particularly, portions that directly emit light) can be prevented from being visible from the outside via the opening portions $102a_1$ and $102a_2$ due to the color of the light guiding plate 105.

For this reason, for example, compared to when the light guiding plate 105 made of a colorless and transparent member is used, light irradiated from the opening portions $102a_1$ and $102a_2$ can be seen more beautifully when the LED units are turned on.

Figure 15:
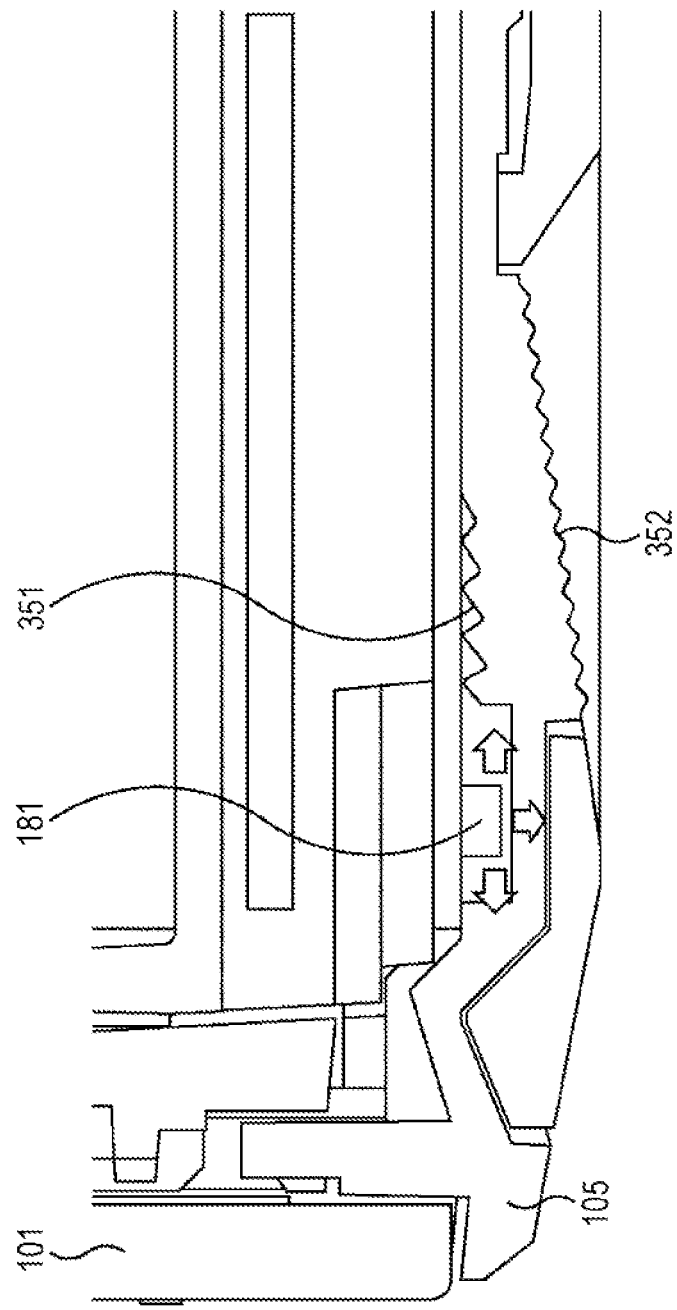
FIG. 15 is a side view illustrating an example of the interior configuration of the smart unit seen from the side.

FIG. 15 is a view illustrating an example of another configuration of the light guiding plate 105 to more soften light from the LED indicator 182. The light guiding plate 105 has wave-shaped machined surfaces 351 and 352 on an upper surface and a lower surface thereof, respectively. A part of the light guiding plate 105 is subjected to a knurling process.

The machined surface 351 is provided on the upper surface behind (on a side opposite to the front panel 101) the LED indicator 182 in the light guiding plate 105. The machined surface 352 is provided on the lower surface behind (on the side opposite to the front panel 101) the LED 182 in the light guiding plate 105.

Figure 16:
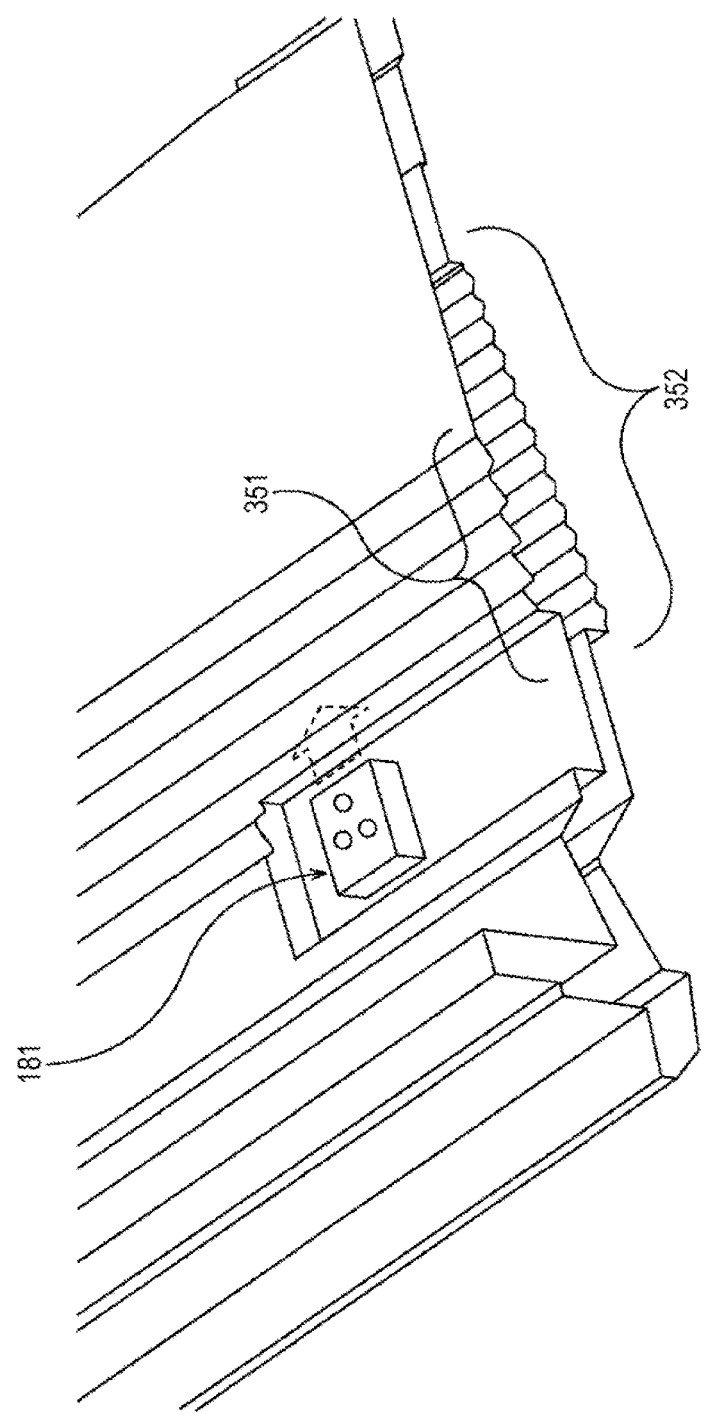
FIG. 16 is a view describing a machined surface.

Referring to FIGS. 15 and 16, the machined surface 351 is provided in a region narrower than that of the machined surface 352. In addition, the machined surface 351 has a wave shape greater than that of the machined surface 352. In other words, the machined surface 351 is configured to have a great elevation difference between the top and the valley of a wave and to have a wide-width wave. In contrast, the machined surface 352 is configured to have a small elevation difference between the top and the valley of a wave and to have a narrow-width wave.

Figure 17:
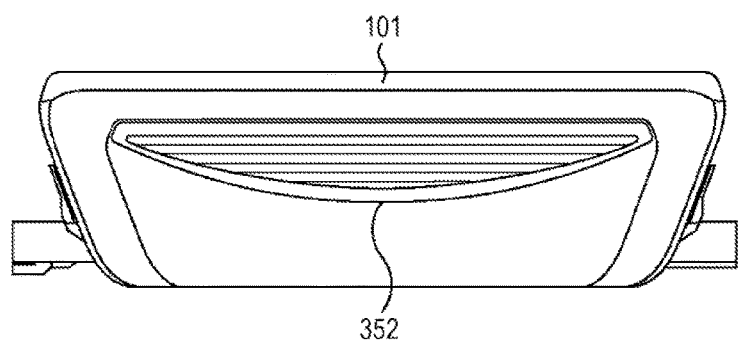
FIG. 17 is a perspective view of the smart unit seen from the bottom.

FIG. 17 illustrates a perspective view of the smart unit 62 seen from the bottom. The machined surface 352 is provided on a lower surface of the smart unit 62 illustrated in FIG. 17. The machined surface 352 is made of a transparent member (a translucent member) that allows light to penetrate therethrough.

In this configuration, light from the LED indicator 182 is directly radiated to the outside of the smart unit 62 via the machined surface 352, and indirectly, is reflected by the machined surface 351 and is radiated to the outside of the smart unit 62 via the machined surface 352.

The machined surface 351 is provided to be able to render soft light by diffusing the light from the LED indicator 182. When a degree of light diffusion by the machined surface 351 is excessively strong, the light is not widely radiated. Accordingly, the waves of the machined surface 351 are configured to be coarse as described above and thus the diffusion is weakened.

The machined surface 352 is provided to be able to render soft light by diffusing the light from the LED indicator 182, but the waves of the machined surface 352 are configured to be coarser than those of the machined surface 351. It is possible to homogenize a degree of diffusion by setting the waves of the machined surface 352 to be fine.

As such, the light guiding plate 105 has two machined surfaces 351 and 5352, and it is possible to soften light radiated to the outside from the smart unit 62 by the wave shape of each machined surface. In addition, it is possible to adjust a degree of light softness, intensity of light or the like by making two machined surfaces 351 and 352 have wave shapes different from each other.

In addition, it is possible to blend light from the LED indicator 182 by diffusing the light from the LED indicator 182 using the wave-shaped machined surfaces 351 and 352. That is, for example, as described above with reference to FIG. 13, the LED indicator 182 is configured to have the LED units 182a, 182b and 183c, and the LED units can serve to respectively emit red (R) color, green (G) color, and blue (B) color.

It is possible to mix the red light, the green light, and the blue light from the LED indicator 182 by diffusing the red light, the green light, and the blue light using the machined surfaces 351 and 352. It is possible to express much variety of colors by adjusting and combining intensity of light emitted from each LED unit 182a, 182b and 183c.

The machined surface 352 is provided on a lower surface of the front panel 101, and is made of a member different from that of the front panel 101. A part of the lower surface of the front panel 101 is cut out, and the machined surface 352 made of a transparent member (a translucent member) is provided by molding in the cutout portion in such a manner that the machined surface 352 has a wave shape.

For example, if the machined surface 352 is made of a transparent member and is configured not to have a wave shape, the LED indicator 182, the communication infrastructure 202 or the like provided in the front panel 101 can be seen by a user. There is also a design in which interior configuration of the communication infrastructure 202 and the like are seen by a user. However, when the design is not adopted, and a configuration in which the interior configuration is not seen by a user is adopted, it is effective that the machined surface 352 is configured to have a wave shape.

That is, since the machined surface 352 has a wave shape, the interior configuration of the smart unit 62 can be prevented from being seen via the machined surface 352 made of a transparent member. In addition, since the machined surface 352 has a fine wave shape, it is possible to further improve an effect that the interior of the smart unit 62 is not seen. As described above, since the machined surface 352 has a fine wave shape, an effect that diffused light can be homogenized is also obtained.

Note that when the smart unit 62 is seen from the bottom, as illustrated in FIG. 17, the machined surface 352 is preferably configured to have the same wave direction as a longitudinal direction of the smart unit 62. In other words, the waves of the machined surface 352 are preferably provided in such a manner that the tops (the valleys) of the waves of the machined surface 352, that is, portions of the machined surface 352 depicted by lines in FIG. 17 are in parallel with the front panel 101.

As such, since the machined surface 352 is provided to have a wave shape, it is possible to further improve an effect that it is difficult to see the interior configuration of the smart unit 62 due to the waves when the smart unit 62 is seen from a front panel 101 side.

As such, it is possible to diffuse light by providing the machined surfaces 351 and 352 on the light guiding plate 105, and to obtain better design. Note that the machined surface 352 is made of a transparent (translucent) member, but the machined surface 351 may be made of a member that allows light to diffuse, and is not required to be made of a transparent (translucent) member.

[Example of Light Distribution]

Figure 18:
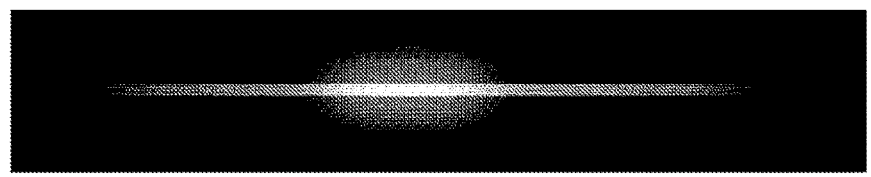
FIG. 18 is a first view illustrating an example of a state of light emitted from the smart unit.

Subsequently, FIG. 18 illustrates an example of a case where the smart unit 62 is seen from the front when the LED units 182a, 182b and 182c are turned on.

Note that FIG. 18 illustrates only the light guiding plate 105 present below the front panel 101 to avoid FIG. 18 from looking too complex.

In FIG. 18, brightness of light is illustrated in a gray scale. In FIG. 18, as a color is closer to a white color, FIG. 18 is illustrated as being bright, and as the color is closer to a black color, FIG. 18 is illustrated as being dark. This is the same even in FIG. 19 to be described later.

As illustrated in FIG. 18, when the LED units 182a, 182b and 182c are turned on, a center portion in FIG. 18 of the light guiding plate 105 is bright, and as if light disappears, the light becomes dark as much as being apart in a right and left direction from the center portion in FIG. 18.

That is, for example, as illustrated in FIGS. 13 and 14, the LED unit 182a is provided on the front panel 101 side further than the LED units 182b and 182c.

For this reason, as illustrated at the center of FIG. 18, light from the LED unit 182a closest to the front panel 101 side can be seen as being the brightest.

In addition, for example, as illustrated in FIG. 13, the LED units 182a, 182b and 182c are provided in a center portion of the communication infrastructure 202.

For this reason, as illustrated on the left and the right sides of FIG. 18, as if light from the LED units 182b and 182c disappears, the light becomes dark as much as being apart from the center of FIG. 18.

Figure 19:
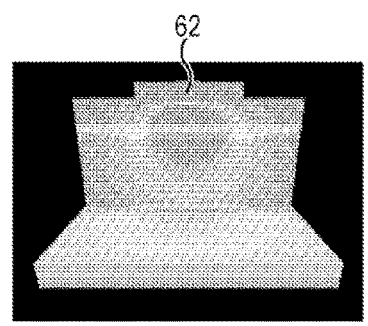
FIG. 19 is a second view illustrating an example of a state of light emitted from the smart unit.

Subsequently, FIG. 19 illustrates an example of when the display main body 61 and the smart unit 62 are detached from the stand 63, and are used as the wall-mounted television receiver 41.

Note that FIG. 19 illustrates only the smart unit 62 and an interior (a wall portion and a floor portion) in which the smart unit 62 is disposed.

As illustrated in FIG. 19, circular light is irradiated on the wall below the smart unit 62, on which the smart unit 62 is disposed.

This is because the crescent-shaped opening portion 102$a_2$ illustrated in FIG. 5 is provided in the bottom surface portion 221 of the storage case 102.

Since brightness distribution of light from the smart unit 62 is as described with reference to FIGS. 18 and 19, it is possible to express soft light as if the soft light surrounds the smart unit 62.

Note that when the display main unit 61 to which the smart unit 62 is added is attached to the stand 63, the stand 63 functions as a wall to reflect light, and similar to the wall-mounted television receiver 41, soft light is emitted as if the soft light surrounds the smart unit 62.

Figure 20:
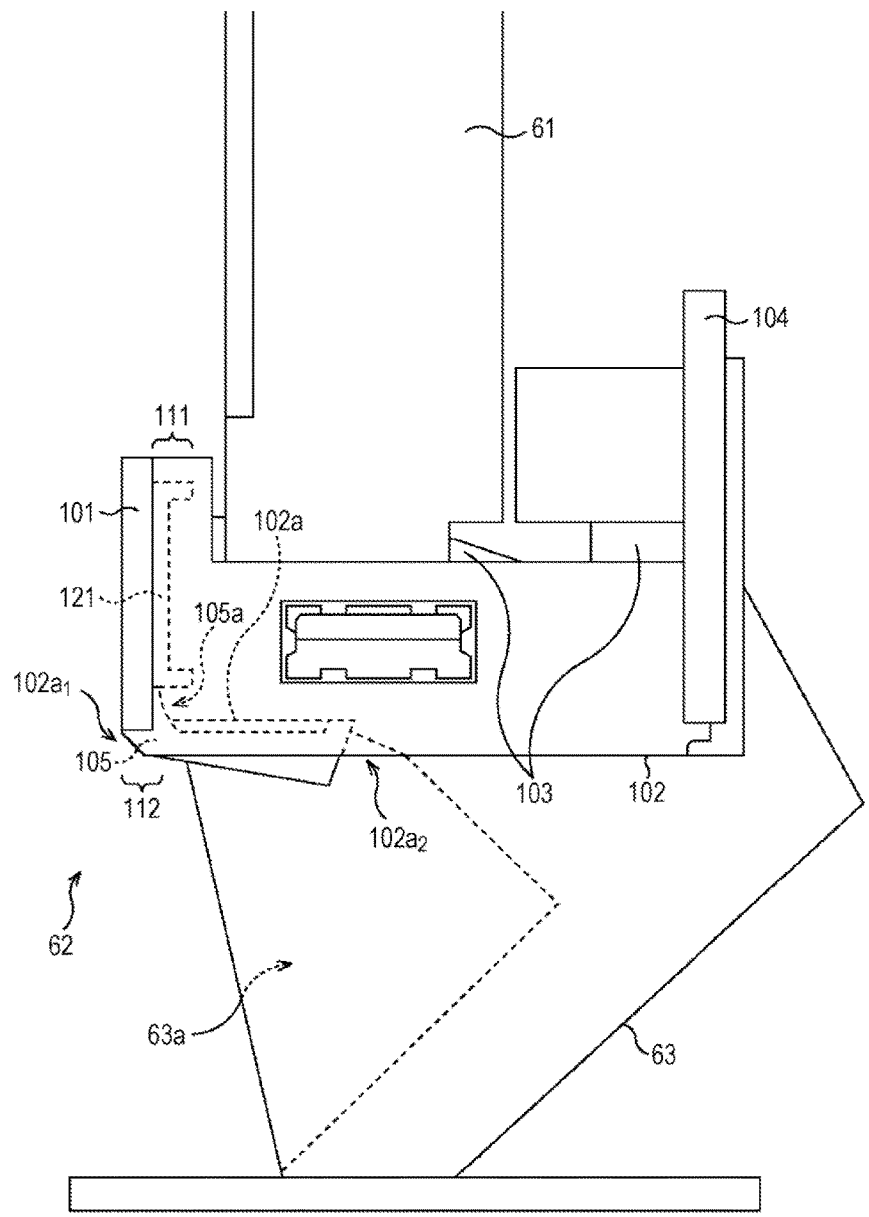
FIG. 20 is a side view of a display main body supported by a stand.

That is, for example, as illustrated in FIG. 20, the stand 63 may be provided with a concave surface portion 63$a$ which is a concave surface, and light from the opening portion 102$a_2$ of the smart unit 62 may be reflected by the concave surface portion 63$a$.

Since the concave surface portion 63$a$ functions as a wall in a case where the television receiver 41 is mounted on the wall and is used, light is expressed as if the light surrounds the smart unit 62. Note that the concave surface portion 63$a$ provided in the stand 63 may have, for example, a triangular pyramid shape or a quadrangular pyramid shape, and may have a rectangular parallelopiped shape.

That is, light from opening portion 102$a_2$ of the smart unit 62 is reflected by the concave surface portion 63$a$ formed in the stand 63, and is irradiated toward a front direction (a left direction in FIG. 20). Accordingly, it is possible to express light similarly to in a case where the television receiver 41 is used as a wall-mounted television receiver.

In addition, the concave surface portion 63$a$ of the stand 63 may have a shape (for example, a concave shape like a parabolic antenna) in which a wireless signal is reflected toward the smart unit 62 by the stand 63 so that receiver sensitivity of the wireless signal improves in the smart unit 62.

By the way, as described above, the film antenna 121 is built in the smart unit 62, but the smart unit 62 may be configured to have a built-in antenna different from the film antenna 121.

That is, if the antenna is stored in the front surface portion 224 that is a protruding portion of the storage case 102, the smart unit 62 may have any type of built-in antenna.

Note that herein, the embodiment illustrates the example in which the antenna is stored in the front surface portion 224 that is the protruding portion of the storage case 102 of the smart unit 62. However, as will be described later, the dispositional position of the antenna is not limited to the front surface portion 224, and any position is acceptable insofar as the antenna is disposed in the smart unit 62.

[Example of Using Another Antenna]

Figure 21:
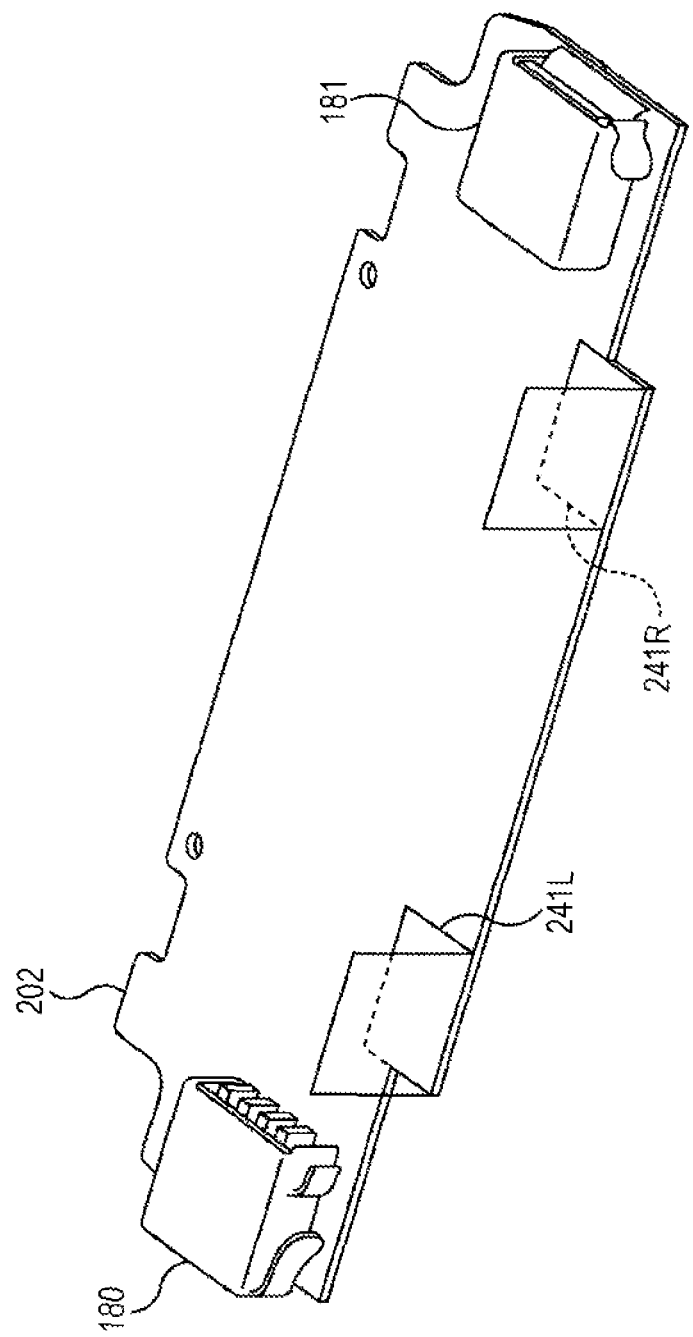
FIG. 21 is a view illustrating an example of the communication substrate that is provided with a metal plate antenna.

Subsequently, FIG. 21 illustrates an example of the communication substrate 202 that is provided with a metal plate antenna.

As illustrated in FIG. 21, metal plate antennas 241L and 241R are provided on the exterior surface of the communication substrate 202, and each metal plate antenna is formed in a L shape and made of a metal plate.

Figure 22:
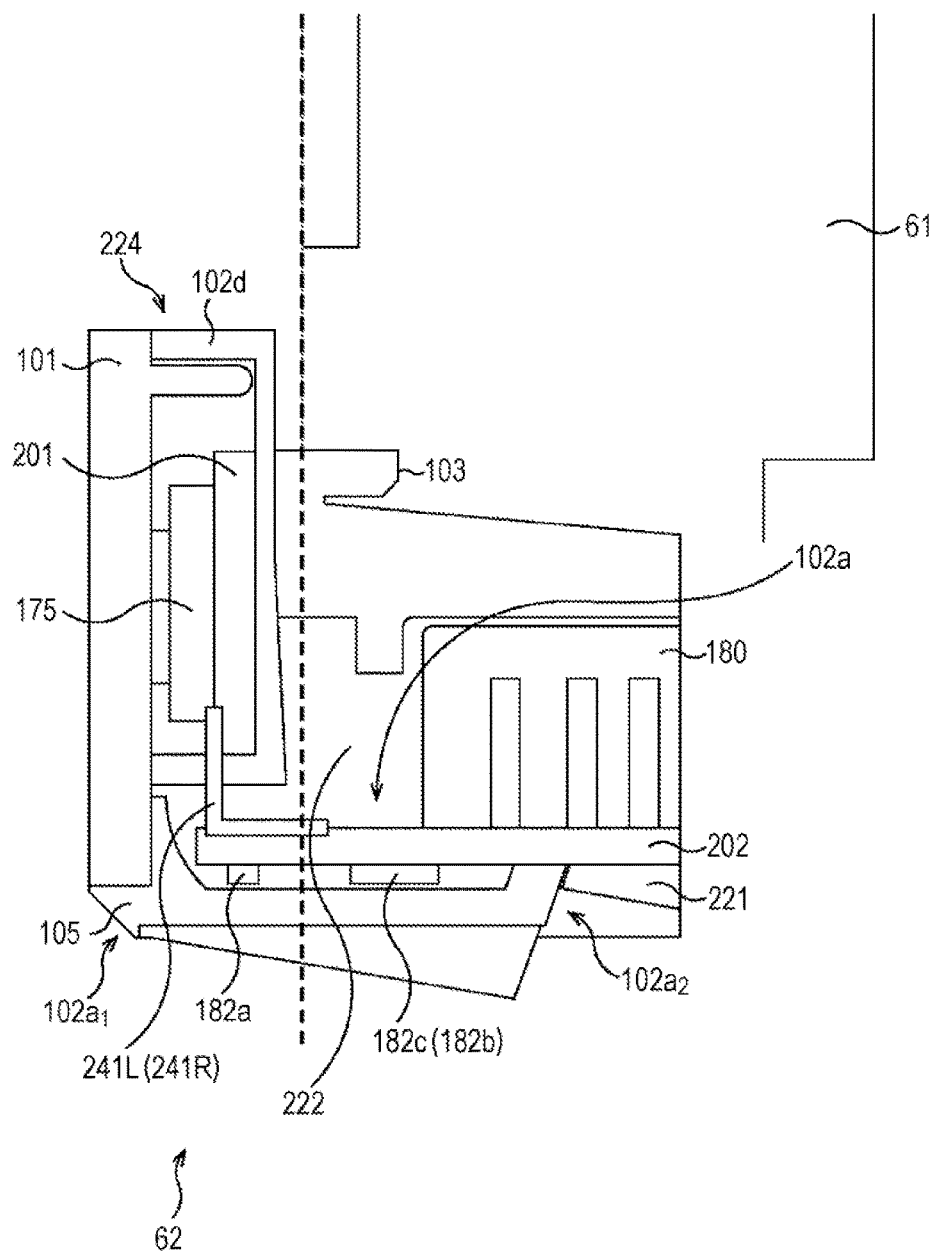
FIG. 22 is a side view of an interior of the smart unit with the built-in communication substrate illustrated and seen from the side in FIG. 20.

FIG. 22 illustrates an example of an interior configuration of the smart unit 62 with the built-in communication substrate 202 when seen from the side in FIG. 21.

Note that in FIG. 22, a part of a back surface side (a side on which the rear cover 104 is present) of the smart unit 62 is not illustrated to avoid FIG. 22 from looking too complex.

In FIG. 22, the L-shaped metal plate antennas 241L and 241R are disposed in front of (on a left side of a dotted line illustrated in FIG. 22) the front surface of the display main body 61 on the exterior surface of the communication substrate 202.

In addition, similarly, the camera substrate 201 is also disposed in front of the front surface of the display main body 61. That is, similar to the metal plate antennas 241L and 241R, the brightness sensor 172, the IR receiving unit 173 and the like provided on the camera substrate 201 are also disposed in front of the front surface of the display main body 61.

Figure 23:
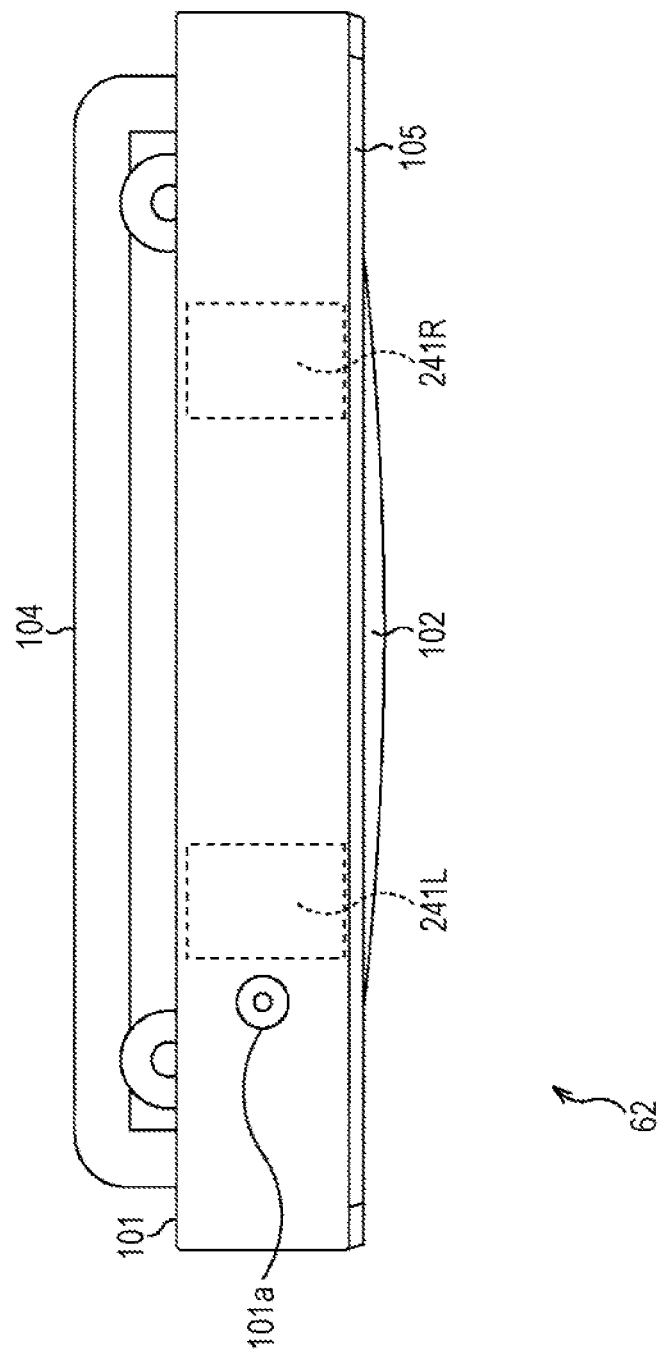
FIG. 23 is a front view of the smart unit that is provided with the metal plate antenna.

Subsequently, FIG. 23 illustrates a front view of the smart unit 62 that is provided with the metal plate antennas 2411L and 241R. As illustrated in FIG. 23, the metal plate antennas 241L and 241R are disposed on the back surface of the front panel 101.

As described with reference to FIGS. 21 to 23, in the smart unit 62, the metal plate antennas 241L and 241R and the IR receiving unit 173 are disposed in front of the front surface of the display main body 61.

For this reason, it is possible to suppress a decrease in receiver sensitivity of an operation signal (an IR signal) such as wireless signals received by the metal plate antennas 241L and 241R or a wireless signal received by the IR receiving unit 173, which is caused by the display main body 61.

In addition, similarly, the brightness sensor 172 in the smart unit 62 is also disposed in front of the front surface of the display main body 61. For this reason, the brightness sensor 172 can detect brightness of a place in which a user is presumed to be present and to watch content such as a program displayed on the display screen of the display main body 61. This is the same even in a case where the film antenna 121 is adopted.

Figure 24:
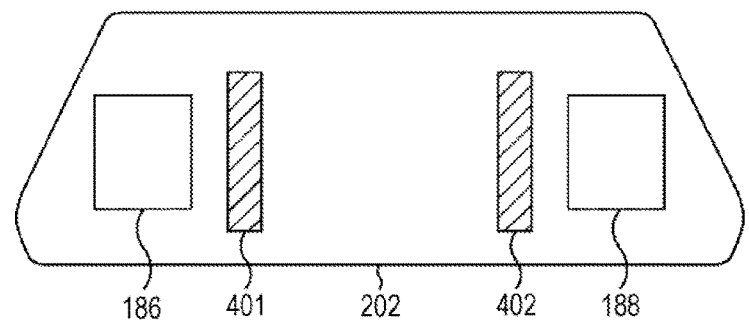
FIG. 24 is a view illustrating another configuration of a communication circuit.

Furthermore, a dispositional position of another antenna will be described. FIG. 24 is a view illustrating a configuration of the communication infrastructure 202 when the communication infrastructure 202 is provided with the BT antenna 186 and the Wi-Fi antenna 188. The BT antenna 186 and the Wi-Fi antenna 188 are disposed apart from each other as much as possible. Accordingly, it is possible to suppress occurrence of interference between wireless communication using the Bluetooth (registered trademark) and wireless communication using the Wi-Fi.

Furthermore, gaskets 401 and 402 are provided to prevent interference between communication using the BT antenna 186 and the Wi-Fi antenna 188. The gasket 401 is provided on a BT antenna 186 side, and the gasket 402 is provided on a Wi-Fi antenna 188 side. The gasket 401 is provided in such a manner that communication from the BT antenna 186 is prevented from leaking to the Wi-Fi antenna 188 side. The gasket 402 is provided in such a manner that communication from the Wi-Fi antenna 188 is prevented from leaking to the BT antenna 186 side.

It is possible to provide another antenna or the control unit 179 (not illustrated in FIG. 24) between the gaskets 401 and 402. The gaskets 401 and 402 may be made of the same member, and may be made of different members. Preferably, the gasket 401 is configured to adopt a material and a size that efficiently shut off communication from the BT antenna 186. Similarly, the gasket 402 is configured to adopt a material and a size that efficiently shut off communication from the Wi-Fi antenna 188.

Figure 25:
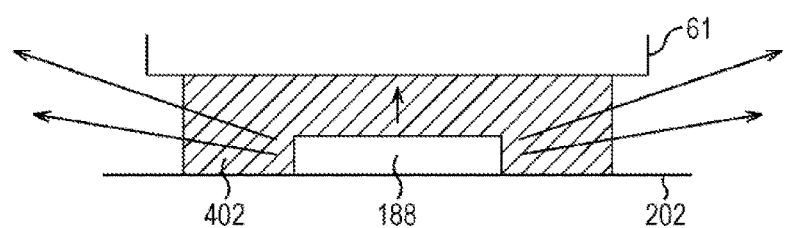
FIG. 25 is a view of the communication circuit seen from the side.

FIG. 25 is a view of the communication infrastructure 202 when the communication infrastructure 202 is horizontally seen. Arrows in FIG. 25 indicate directions in which wireless signals are radiated. FIG. 25 is the view of the communication infrastructure 202 seen from the Wi-Fi antenna 188 provided on the communication infrastructure 202. Accordingly, the gasket 402 is provided in a backward direction in FIG. 25. The display main body 61 is configured in such a manner that a lower surface of the display main body 61 is positioned to come into contact with an upper surface of the gasket 402, that is, an upper portion of the Wi-Fi antenna 188.

Typically, a lower surface of the bezel of the display main body 61 is configured to contain a material that is not suitable for good communication, for example, metal. Alternatively, at least a part of the bezel in contact with the smart unit 62 is configured to contain a material that is not suitable for good communication, for example, metal or the like. In this configuration, as illustrated in FIG. 25, communication from the Wi-Fi antenna 188 is shut off in an upward direction thereof.

Accordingly, the bezel of the display main body 61 can shut off communication leaking from the Wi-Fi antenna 188 to the BT antenna 186 through the upper portion of the gasket 402. Although not illustrated, but similarly, an upper portion of the gasket 401 is configured to come into contact with the lower surface of the bezel of the display main body 61. Accordingly, the bezel of the display main body 61 can shut off communication leaking from the BT antenna 186 to the Wi-Fi antenna 188 through the upper portion of the gasket 401.

Referring to FIG. 25, a signal from the Wi-Fi antenna 188 is shut off in an upper side and a gasket 402 side, but is radiated to the outside of the smart unit 62 in the front direction, a rearward direction and an opposite direction of the gasket 402. Although not illustrated, but similarly, a signal from the BT antenna 186 is shut off in an upper side and a gasket 401 side, but is radiated to the outside of the smart unit 62 in the front direction, the rearward direction and an opposite direction of the gasket 401.

As such, since the embodiment adopts the configuration in which the gaskets are provided, it is possible to prevent occurrence of interference between wireless communication by the BT antenna 186 using the Bluetooth (registered trademark) and wireless communication by the Wi-Fi antenna 188 using the Wi-Fi. Since interference is prevented, and communication in a necessary direction is efficiently performed, the communication is not disturbed.

Note that the BT antenna 186 and the Wi-Fi antenna 188 which are provided on the communication infrastructure 202 may be configured to be integrated with the communication infrastructure 202 as a single substrate, and that the BT antenna 186 and the Wi-Fi antenna 188 can also be configured as members which are connected to the communication infrastructure 202 (a state where the communication infrastructure 202 does not have both antennas provided thereon, but has a part of both antennas provided thereon). For example, the BT antenna 186 and the Wi-Fi antenna 188 may be provided to be connected to the communication infrastructure 202 using a connector such as a B to B connector. In addition, the respective shapes of the BT antenna 186 and the Wi-Fi antenna 188 are not limited to a film shape, and the present technology is applicable to any shape of the antenna.

By the way, in the description of the embodiment, the smart unit 62 has the functional configuration illustrated in FIG. 7. However, the functional configuration of the smart unit 62 is not limited to the embodiment.

That is, for example, the smart unit 62 may be configured to have the repeater 171, the brightness sensor 172, the IR receiving unit 173, the repeater 178, the control unit 179, the USB terminal connection units 180 and 181 and the LED indicator 182.

In addition, for example, in the smart unit 62, a new function block (for example, a new camera and the like) may be added to the configuration illustrated in FIG. 7. Furthermore, for example, in FIG. 7, one or two of the BT antenna 186, the NFC antenna 187 and the Wi-Fi antenna 188 can be configured to be built in the smart unit 62.

Note that the smart unit 62 has a size and a shape which are different based on the number of components built in the housing thereof.

[Example of Exterior of Another Television Receiver]

FIGS. 26 to 41 illustrate examples of respective exteriors of a first to a fifth television receivers each of which is configured to have the smart unit, the display main body, and the stand.

Figure 26:
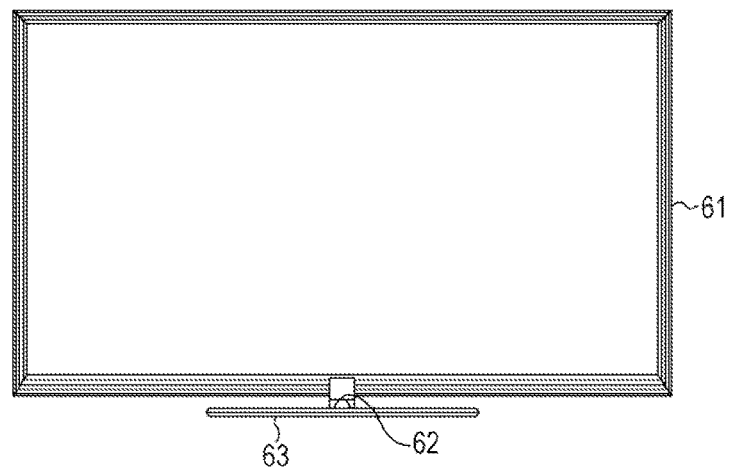
FIG. 26 is a front view of a first television receiver.
Figure 27:
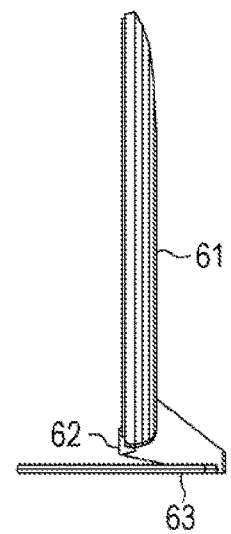
FIG. 27 is a side view of the first television receiver.
Figure 28:
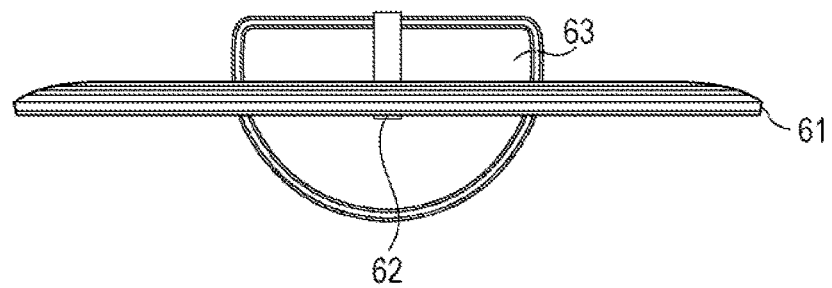
FIG. 28 is a top view of the first television receiver.

That is, FIG. 26 illustrates a front view of the first television receiver when a surface of a display is seen from the front. FIG. 27 illustrates a side view of the first television receiver illustrated and seen from the right side in FIG. 26. In addition, FIG. 28 illustrates a top view of the first television receiver illustrated and seen from the top in FIG. 26.

Figure 29:
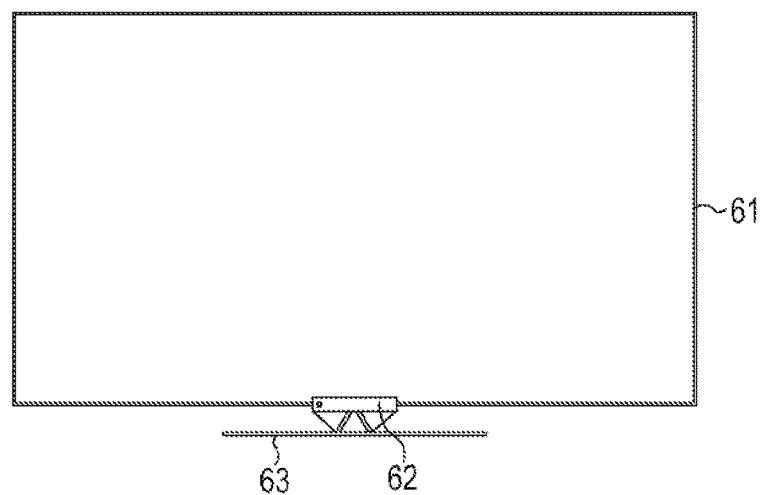
FIG. 29 is a front view of a second television receiver.
Figure 30:
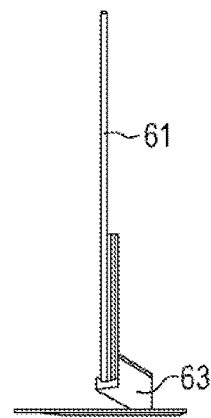
FIG. 30 is a side view of the second television receiver.
Figure 31:
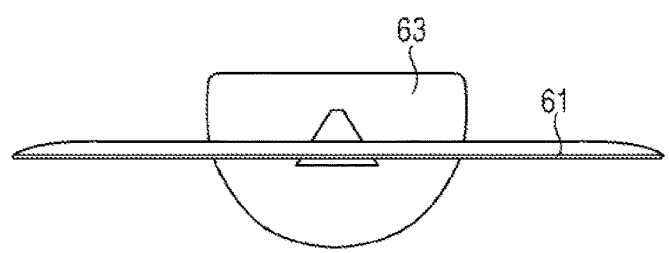
FIG. 31 is a top view of the second television receiver.

FIG. 29 illustrates a front view of the second television receiver when a surface of a display is seen from the front. FIG. 30 illustrates a side view of the second television receiver illustrated and seen from the right side in FIG. 29. In addition, FIG. 31 illustrates a top view of the second television receiver illustrated and seen from the top in FIG. 29.

Figure 32:
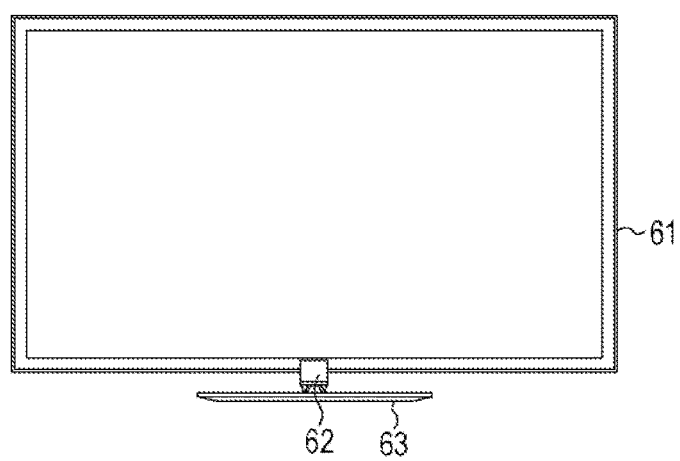
FIG. 32 is a front view of a third television receiver.
Figure 33:
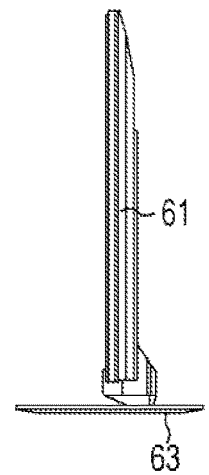
FIG. 33 is a side view of the third television receiver.
Figure 34:
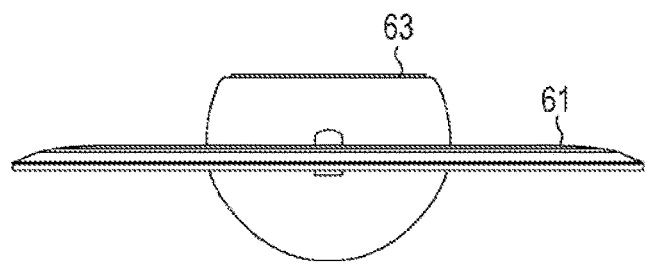
FIG. 34 is a top view of the third television receiver.

FIG. 32 illustrates a front view of the third television receiver when a surface of a display is seen from the front. FIG. 33 illustrates a side view of the third television receiver illustrated and seen from the right side in FIG. 32. In addition, FIG. 34 illustrates a top view of the third television receiver illustrated and seen from the top in FIG. 32.

Figure 35:
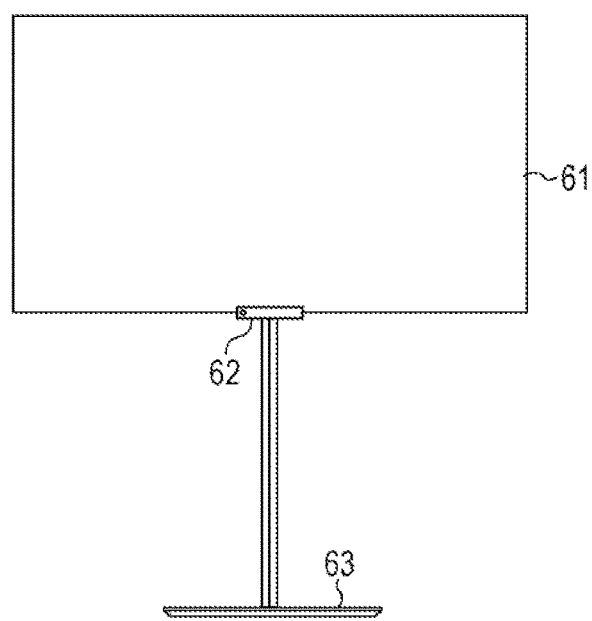
FIG. 35 is a front view of a fourth television receiver.
Figure 36:
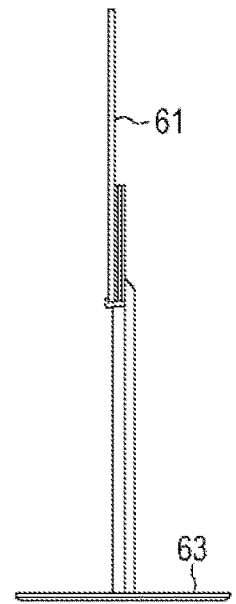
FIG. 36 is a side view of the fourth television receiver.
Figure 37:
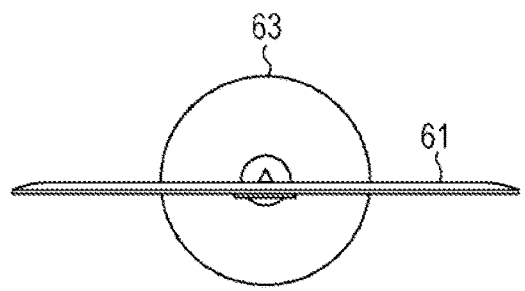
FIG. 37 is a top view of the fourth television receiver.

FIG. 35 illustrates a front view of the fourth television receiver when a surface of a display is seen from the front. FIG. 36 illustrates a side view of the fourth television receiver illustrated and seen from the right side in FIG. 35. In addition, FIG. 37 illustrates a top view of the fourth television receiver illustrated and seen from the top in FIG. 35.

Figure 38:
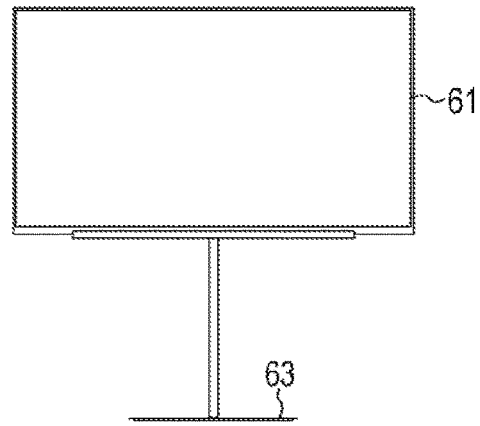
FIG. 38 is a front view of a fifth television receiver.
Figure 39:
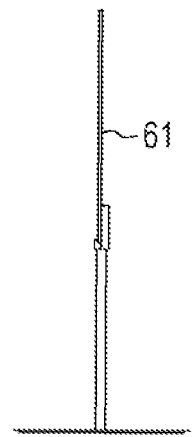
FIG. 39 is a side view of the fifth television receiver.
Figure 40:
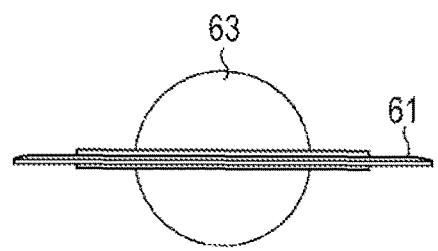
FIG. 40 is a top view of the fifth television receiver.
Figure 41:
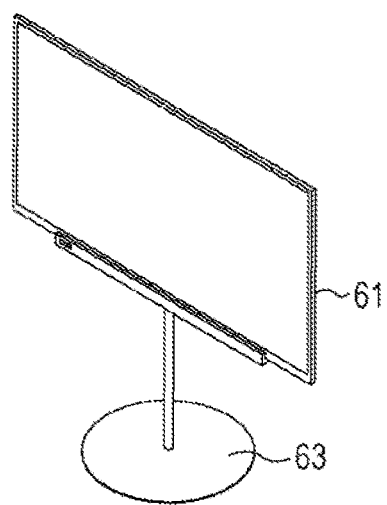
FIG. 41 is a perspective view of the fifth television receiver.

FIG. 38 illustrates a front view of the fifth television receiver when a surface of a display is seen from the front. FIG. 39 illustrates a side view of the fifth television receiver illustrated and seen from the right side in FIG. 38. In addition, FIG. 40 illustrates a top view of the fifth television receiver illustrated and seen from the top in FIG. 38. Furthermore, FIG. 41 illustrates a perspective view of the fifth television receiver illustrated and seen diagonally in FIG. 38.

Subsequently, FIGS. 42 to 50 illustrate examples of respective exteriors of a sixth to an eighth television receivers each of which is configured to have the smart unit, and the display main body.

Note that the sixth to the eighth television receivers are not supported by the respective stands, and are used as a wall-mounted television receiver.

Figure 42:
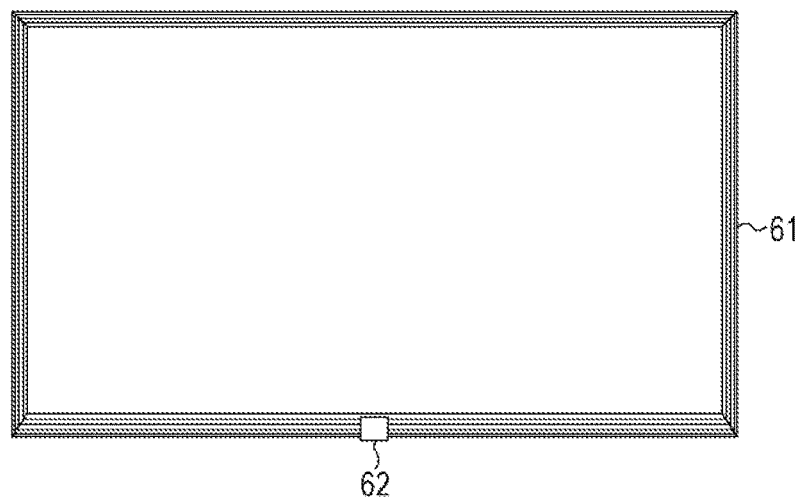
FIG. 42 is a front view of a sixth television receiver.
Figure 43:
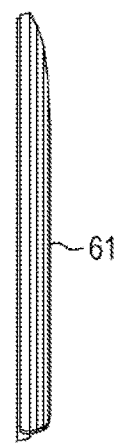
FIG. 43 is a side view of the sixth television receiver.
Figure 44:
FIG. 44 is a top view of the sixth television receiver.

FIG. 42 illustrates a front view of the sixth television receiver when a surface of a display is seen from the front. FIG. 43 illustrates a side view of the sixth television receiver illustrated and seen from the right side in FIG. 42. In addition, FIG. 44 illustrates a top view of the sixth television receiver illustrated and seen from the top in FIG. 42.

Figure 45:
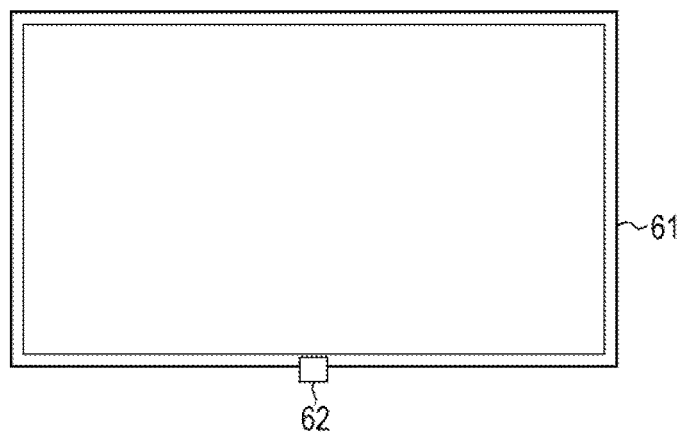
FIG. 45 is a front view of a seventh television receiver.
Figure 46:
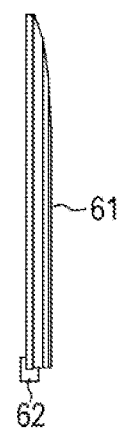
FIG. 46 is a side view of the seventh television receiver.
Figure 47:
FIG. 47 is a top view of the seventh television receiver.

FIG. 45 illustrates a front view of the seventh television receiver when a surface of a display is seen from the front. FIG. 46 illustrates a side view of the seventh television receiver illustrated and seen from the right side in FIG. 45. In addition, FIG. 47 illustrates a top view of the seventh television receiver illustrated and seen from the top in FIG. 45.

Figure 48:
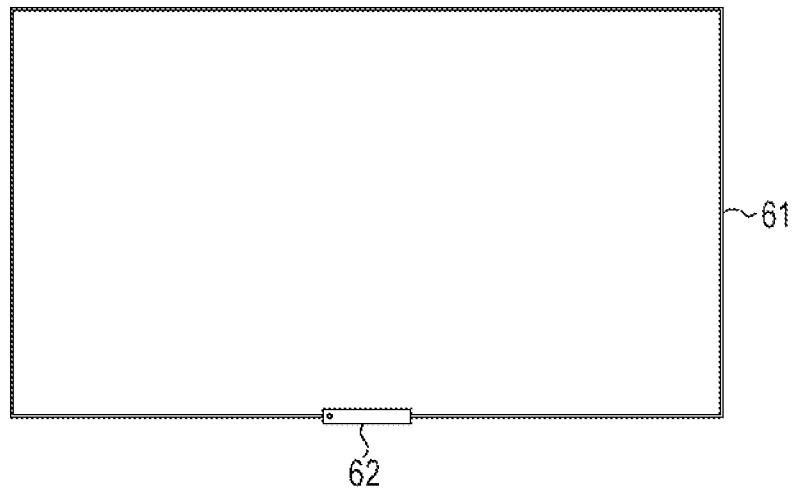
FIG. 48 is a front view of an eighth television receiver.
Figure 49:
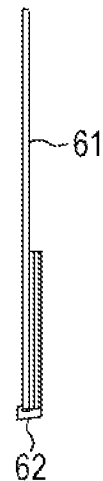
FIG. 49 is a side view of the eighth television receiver.
Figure 50:
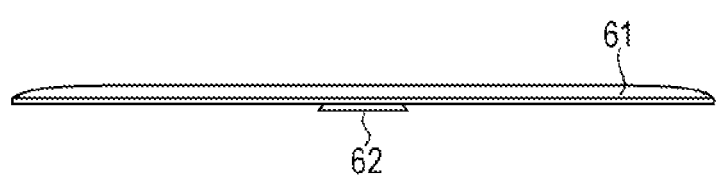
FIG. 50 is a top view of the eighth television receiver.

FIG. 48 illustrates a front view of the eighth television receiver when a surface of a display is seen from the front. FIG. 49 illustrates a side view of the eighth television receiver illustrated and seen from the right side in FIG. 48. In addition, FIG. 50 illustrates a top view of the eighth television receiver illustrated and seen from the top in FIG. 48.

3. Modification Example

In the embodiment, the smart unit 62 is added to the display main body 61, and exchanges data with the display main body 61 via a signal line.

However, for example, if the smart unit 62 is configured to exchange date with the display main body 61 via wireless communication, it is not necessary to connect the smart unit 62 to the display main body 61. Accordingly, a user can dispose the smart unit 62 at a user desired place. Note that a battery and the like are built in the smart unit 62 to supply electric power to each unit.

In addition, the built-in camera 175 of the smart unit 62 captures an image of a viewer, and the smart unit 62 can be configured to recognize the viewer based on the captured image obtained by capturing the image. In this case, the smart unit 62 supplies the recognition result to the display main body 61, and the display main body 61 can display content that matches a taste of the user recognized based on the recognition result from the smart unit 62.

In addition, for example, the smart unit 62 may detached from the display main body 61 and be used as a monitoring camera. In this case, for example, the built-in camera 175 of the smart unit 62 can capture images of the surroundings, and the smart unit 62 can transmit via wireless communication and display the captured images obtained by capturing the images on the display main body 61.

Note that the smart unit 62 may have a comparatively small display unit provided on the exterior surface of the front panel 101, and predetermined information may be displayed on the display unit.

That is, for example, if predetermined information (for example, current time and the like) is displayed on the display unit provided on the exterior surface of the front panel 101, even though a user watches content displayed on the display main body 61, the user can easily know the predetermined information.

Herein, for example, as the display unit, it is possible to adopt an electronic paper that can display letters and the like in a state of not being energized in addition to an organic EL display and the like.

In addition, in the embodiment, the smart unit 62 is provided with the USB terminal connection units 180 and 181.

However, the smart unit 62 can be configured in such a manner that terminal connection portions of the USB terminal connection units 180 and 181 can protrude from the housing of the smart unit 62.

In addition, for example, the terminal connection portions of the USB terminal connection units 180 and 181 may protrude from the housing of the smart unit 62, and the protruding portions may be configured to be rotatable in a predetermined direction about the smart unit 62.

Furthermore, for example, in the USB terminal connection units 180 and 181, the terminal connection portions, which are connected to signal lines extendable from the housing of the smart unit 62 by a predetermined length, may be configured to be pulled out of the housing. Note that the respective terminal connection portions of the USB terminal connection units 180 and 181 are connected to the USB terminal connection units 180 and 181 in the housing via the respective signal lines connected thereto.

If the USB terminal connection units 180 and 181 are configured as described above, when a USB memory or the like is connected thereto, it is possible to bring the terminal connection portions of the USB terminal connection units 180 and 181 to the outside of the housing of the smart unit 62. For this reason, it is possible to more easily to connect a USB memory or the like to the USB terminal connection units 180 and 181.

In the embodiment, the smart unit 62 is provided with the USB terminal connection units 180 and 181. However, in addition to this configuration, for example, the smart unit 62 may be provided with an HDMI terminal connection unit to which an HDMI terminal is connected instead of the USB terminal connection units 180 and 181. That is, the type of the terminal connected to the smart unit 62 is not limited to the USB terminal, and may be the HDMI terminal. The smart unit 62 may be configured that a plurality of types of the terminal can be connected thereto.

In addition, in the embodiment, the smart unit 62 is added to the display main body 61, but a target, to which the smart unit 62 is added, is not limited to the display main body 61. For example, the smart unit 62 can be added to a personal computer or the like.

By the way, the present technology can have the following configuration.

(1) A light emitting device including: a plate-shaped member that is provided with a light emitting unit which emits light; a concave member that has a concave surface portion which is a concave surface to cover the light emitting unit, and that receives the light from the light emitting unit using the concave surface portion; and a storage unit that stores the plate-shaped member and the concave member in a state where a part of the concave member is exposed. The concave member allows the light from the light emitting unit to penetrate to a part of the concave member exposed from the storage unit by diffusing the light received using the concave surface portion.

(2) In the light emitting device according to the (1), a bottom surface of the concave surface portion is a plate-shaped member formed in a semicircular shape. The plate-shaped member and the concave member are stored in the storage unit in a state of exposing a first portion that is formed as a part of the concave member in a portion which corresponds to a chord of a semicircle on the bottom surface, and exposing a second portion that is formed as a part of the concave member in a portion which corresponds to an arc of the semicircle on the bottom surface.

(3) The light emitting device according to the (2), the concave member allows predetermined single colored light from the light emitting unit to penetrate to the first portion by diffusing the single colored light. The concave member allows a plurality of colors of light from the light emitting unit to penetrate to the first and the second portions by diffusing the plurality of colors of light.

(4) In the light emitting device according to the (3), the light emitting unit has a first irradiation unit that irradiates the predetermined single colored light in a direction in which the first portion is present, and a second irradiation unit that irradiates the plurality of colors of light in a direction in which the bottom surface of the concave surface portion is present.

(5) In the light emitting device according to the (4), the first irradiation unit is provided closer to the first portion than the second irradiation unit.

(6) The light emitting device according to the (1) to (5) further includes an adding unit that adds the storage unit to electronic equipment. The light emitting unit emits light based on a control signal from the electronic equipment to which the storage unit is added via the adding unit.

(7) The light emitting device according to the (1) to (6) further includes a supporting unit that supports the electronic equipment to which the storage unit is added, and that has a reflective surface which reflects light penetrating a part of the concave member exposed from the storage unit.

(8) In the light emitting device according to the (1) to (7), the bottom surface and an upper surface facing the bottom surface of the concave member have a wave shape.

(9) In the light emitting device according to the (8), the wave shape of the bottom surface is coarser than that of the upper surface.

Note that the present disclosure is not limited to the embodiment described above, and various modifications can be made to the present disclosure insofar as the modifications do not depart from the scope of the present disclosure.

REFERENCE SIGNS LIST 41 television receiver, 61 display main body, 62 smart unit, 63 stand, 63a concave surface portion, 101 front panel, 101a exposure hole, 102 storage case, 102a through hole, 102$a_1$, 102$a_2$ opening portion, 102b, 102c cylindrical portion, 102d concave portion, 102e hole, 102f groove, 103 connection member, 104 rear cover, 105 light guiding plate, 105a concave surface portion, 111 right end portion, 112 lower end portion, 121 film antenna, 121a signal line, 171 relay unit, 172 brightness sensor, 173 IR receiving unit, 174 encoder, 175 camera, 176, 177 microphone, 178 relay unit, 179 control unit, 180, 181 USB terminal connection unit, 182 LED indicator, 182a to 182c LED unit, 183 touch detection unit, 184, 185 detection electrode, 186 BT antenna, 187 NFC antenna, 188 Wi-Fi antenna, 201 camera substrate, 202 communication substrate, 221 bottom surface portion, 222, 223 side surface portion, 224 front surface portion, 241L, 241R metal plate antenna.

The invention claimed is:

1. A light emitting device comprising:
a plate-shaped member that is provided with a light emitting unit which emits light;
a concave member that has a concave surface portion which is a concave surface to cover the light emitting unit, the concave member being arranged so that emitted light from the light emitting unit is received at the concave surface portion; and
a storage unit that stores the plate-shaped member and the concave member in a state where a first part of the concave member and a second part of the concave member are exposed such that the first part is exposed from a first surface of the light emitting device and the second part is exposed from a second surface of the light emitting device, the first surface being different from the second surface, wherein the concave member is configured to allow the emitted light from the light emitting unit to penetrate to the first part and the second part exposed from the storage unit to diffuse the light received at the concave surface portion to form diffused light to be irradiated outward of the light emitting device;
wherein the plate-shaped member and the concave member are stored in the storage unit in a state of exposing a first portion that is formed as a part of the concave member in a portion which corresponds to a chord of a semicircle on a bottom surface of the concave surface portion, and exposing a second portion that is formed as a part of the concave member in a portion which corresponds to an arc of the semicircle on the bottom surface.

2. A light emitting device comprising:
a plate-shaped member that is provided with a light emitting unit which emits light;
a concave member that has a concave surface portion which is a concave surface to cover the light emitting unit, and that receives the light from the light emitting unit using the concave surface portion; and
a storage unit that stores the plate-shaped member and the concave member,
wherein the concave member allows the light from the light emitting unit to penetrate to a part of the concave member exposed from the storage unit by diffusing the light received using the concave surface portion,
wherein a bottom surface of the concave surface portion has a semicircular shape, and
wherein the plate-shaped member and the concave member are stored in the storage unit in a state of exposing a first portion that is formed as a part of the concave member in a portion which corresponds to a chord of a semicircle on the bottom surface, and exposing a second portion that is formed as a part of the concave member in a portion which corresponds to an arc of the semicircle on the bottom surface.

3. The light emitting device according to claim 2,
wherein the concave member allows single colored light from the light emitting unit to penetrate to the first portion by diffusing the single colored light, and
wherein the concave member allows a plurality of colors of light from the light emitting unit to penetrate to the first and the second portions by diffusing the plurality of colors of light.

4. The light emitting device according to claim 3,
wherein the light emitting unit has a first irradiation unit that irradiates the single colored light in a direction in which the first portion is present, and a second irradiation unit that irradiates the plurality of colors of light in a direction in which the bottom surface of the concave surface portion is present.

5. The light emitting device according to claim 4,
wherein the first irradiation unit is provided closer to the first portion than the second irradiation unit.

6. The light emitting device according to claim 2, further comprising:
an adding unit that adds the storage unit to electronic equipment, and
wherein the light emitting unit emits light based on a control signal from the electronic equipment to which the storage unit is added via the adding unit.

7. The light emitting device according to claim 2, further comprising:
a supporting unit that supports the electronic equipment to which the storage unit is added, and that has a reflective surface which reflects light penetrating a part of the concave member exposed from the storage unit.

8. The light emitting device according to claim 2, wherein the bottom surface and an upper surface facing the bottom surface of the concave member have a wave shape.

9. The light emitting device according to claim 8, wherein the wave shape of the bottom surface is coarser than that of the upper surface.

10. A display device comprising:
a plate-shaped member that is provided with a light emitting unit which emits light;
a concave member that has a concave surface portion which is a concave surface to cover the light emitting unit, and that receives the light from the light emitting unit using the concave surface portion; and
a storage unit that stores the plate-shaped member and the concave member,
wherein the concave member allows the light from the light emitting unit to penetrate to a part of the concave member exposed from the storage unit by diffusing the light received using the concave surface portion,
wherein a bottom surface of the concave surface portion has a semicircular shape, and
wherein the plate-shaped member and the concave member are stored in the storage unit in a state of exposing a first portion that is formed as a part of the concave member in a portion which corresponds to a chord of a semicircle on the bottom surface, and exposing a second portion that is formed as a part of the concave member in a portion which corresponds to an arc of the semicircle on the bottom surface.

11. A light emitting device comprising:
a plate-shaped member that is provided with a light emitting unit which emits light;
a concave member that has a concave surface portion which is a concave surface to cover the light emitting unit, the concave member being arranged so that emitted light from the light emitting unit is received at the concave surface portion; and
a storage unit that stores the plate-shaped member and the concave member in a state where a first part of the concave member and a second part of the concave member are exposed such that the first part is exposed from a first surface of the light emitting device and the second part is exposed from a second surface of the light emitting device, the first surface being different from the second surface, wherein the concave member is configured to allow the emitted light from the light emitting unit to penetrate to the first part and the second part exposed from the storage unit to diffuse the light received at the concave surface portion to form diffused light to be irradiated outward of the light emitting device;
wherein the plate-shaped member and the concave member are stored in the storage unit in a state of exposing a first portion on a bottom surface of the concave surface portion, and exposing a second portion that is formed as a part of the concave member in another portion on the bottom surface.

12. A light emitting device comprising:
a plate-shaped member that is provided with a light emitting unit which emits light;
a concave member that has a concave surface portion which is a concave surface to cover the light emitting unit, and that receives the light from the light emitting unit using the concave surface portion; and
a storage unit that stores the plate-shaped member and the concave member,
wherein the concave member allows the light from the light emitting unit to penetrate to a part of the concave member exposed from the storage unit by diffusing the light received using the concave surface portion,
wherein the plate-shaped member and the concave member are stored in the storage unit in a state of exposing a first portion that is formed as a part of the concave member in a portion on the bottom surface, and exposing a second portion that is formed as a part of the concave member in another portion on the bottom surface.

13. The light emitting device according to claim 12, wherein the concave member allows single colored light from the light emitting unit to penetrate to the first portion by diffusing the single colored light, and
wherein the concave member allows a plurality of colors of light from the light emitting unit to penetrate to the first and the second portions by diffusing the plurality of colors of light.

14. The light emitting device according to claim 13, wherein the light emitting unit has a first irradiation unit that irradiates the single colored light in a direction in which the first portion is present, and a second irradiation unit that irradiates the plurality of colors of light in a direction in which the bottom surface of the concave surface portion is present.

15. The light emitting device according to claim 14, wherein the first irradiation unit is provided closer to the first portion than the second irradiation unit.

16. The light emitting device according to claim 12, further comprising:
an adding unit that adds the storage unit to electronic equipment, and
wherein the light emitting unit emits light based on a control signal from the electronic equipment to which the storage unit is added via the adding unit.

17. The light emitting device according to claim 12, further comprising:
a supporting unit that supports the electronic equipment to which the storage unit is added, and that has a reflective surface which reflects light penetrating a part of the concave member exposed from the storage unit.

18. The light emitting device according to claim 12, wherein the bottom surface and an upper surface facing the bottom surface of the concave member have a wave shape.

19. The light emitting device according to claim 18, wherein the wave shape of the bottom surface is coarser than that of the upper surface.

20. A display device comprising:
a plate-shaped member that is provided with a light emitting unit which emits light;
a concave member that has a concave surface portion which is a concave surface to cover the light emitting unit, and that receives the light from the light emitting unit using the concave surface portion; and
a storage unit that stores the plate-shaped member and the concave member,
wherein the concave member allows the light from the light emitting unit to penetrate to a part of the concave member exposed from the storage unit by diffusing the light received using the concave surface portion,
wherein the plate-shaped member and the concave member are stored in the storage unit in a state of exposing a first portion that is formed as a part of the concave member in a portion on the bottom surface, and exposing a second portion that is formed as a part of the concave member in another portion on the bottom surface.

\* \* \* \* \*